United States Patent [19]

Russell

[11] 4,150,397

[45] Apr. 17, 1979

[54] REPETITION REDUCED DIGITAL DATA RECORD AND PLAYBACK SYSTEM

[75] Inventor: James T. Russell, Richland, Wash.

[73] Assignee: Eli S. Jacobs, New York, N.Y.

[21] Appl. No.: 832,837

[22] Filed: Sep. 13, 1977

[51] Int. Cl.$^2$ .......................... H04N 5/76; H04N 7/12
[52] U.S. Cl. ........................................ 358/127; 360/9; 360/32; 360/19; 358/136
[58] Field of Search ............... 358/127, 128, 130, 132, 358/136, 135, 145; 179/100.3 V; 360/9, 8, 33, 32, 19

[56] References Cited

U.S. PATENT DOCUMENTS

| | | | |
|---|---|---|---|
| 2,295,023 | 9/1942 | Beatty | 358/17 |
| 3,472,962 | 10/1969 | Sanford | 358/158 |
| 3,475,549 | 10/1969 | Goldmark | 358/7 |
| 3,571,505 | 3/1971 | Mounts | 358/136 |
| 3,597,759 | 8/1971 | Hause | 340/324 A |
| 3,603,725 | 9/1971 | Cutler | 358/136 |
| 3,678,181 | 7/1972 | Goldmark | 179/100.3 |
| 3,720,780 | 3/1973 | Remy | 358/133 |
| 3,755,624 | 8/1973 | Sekimoto | 358/148 |
| 3,758,713 | 9/1973 | Sekimoto | 358/133 |
| 3,795,763 | 3/1974 | Golding | 358/13 |
| 3,819,852 | 6/1974 | Wolf | 358/145 |
| 3,825,832 | 7/1974 | Frei | 325/38 B |
| 3,891,794 | 6/1975 | Russell | 358/128 |
| 3,898,378 | 8/1975 | Hinoshita | 358/136 |
| 3,924,062 | 12/1975 | Broadbent | 360/19 |
| 3,931,510 | 1/1976 | Kmetz | 333/70 T |
| 4,016,361 | 4/1977 | Pandey | 360/9 |
| 4,051,530 | 9/1977 | Kuroda | 358/156 |

OTHER PUBLICATIONS

"A Video Encoding System With Conditional Picture—Element Replenishment" by F. W. Mounte, The Bell System, Technical Journal, Sep. 1969.

Primary Examiner—Vincent P. Canney
Assistant Examiner—Alan Faber
Attorney, Agent, or Firm—Klarquist, Sparkman, Campbell, Leigh, Hall & Whinston

[57] ABSTRACT

A record and playback system for reducing repetition redundancy is described in which during recording, a partially repetitive signal, such as a television signal, is converted into digital data words each representing the signal occurring during a particular TV line subinterval. A comparator unit receives the data words and compares each received word with a word from a recirculating storage that corresponds to the same line subinterval in its frame as that of the compared received data word. When the compared words differ by a predetermined value, the received word replaces the stored word in the storage and is also stored in a changed data memory as an updated data word along with address words. A recording control circuit intermittently causes the read out of data from the changed data memory for recording at selected positions of a data record. The storage includes alternately operating first and second recirculating storages which each store a set of data words equal in number to the number of data words of one-half a TV frame. Audio data words are stored for recording during vertical blanking intervals of the signal. On playback, a record pickup intermittently reads data words from the record to a record pickup memory whenever this memory is nearly empty. A composite signal generator reconstructs the recorded television signal from data words it receives from the display storage and display control.

30 Claims, 11 Drawing Figures

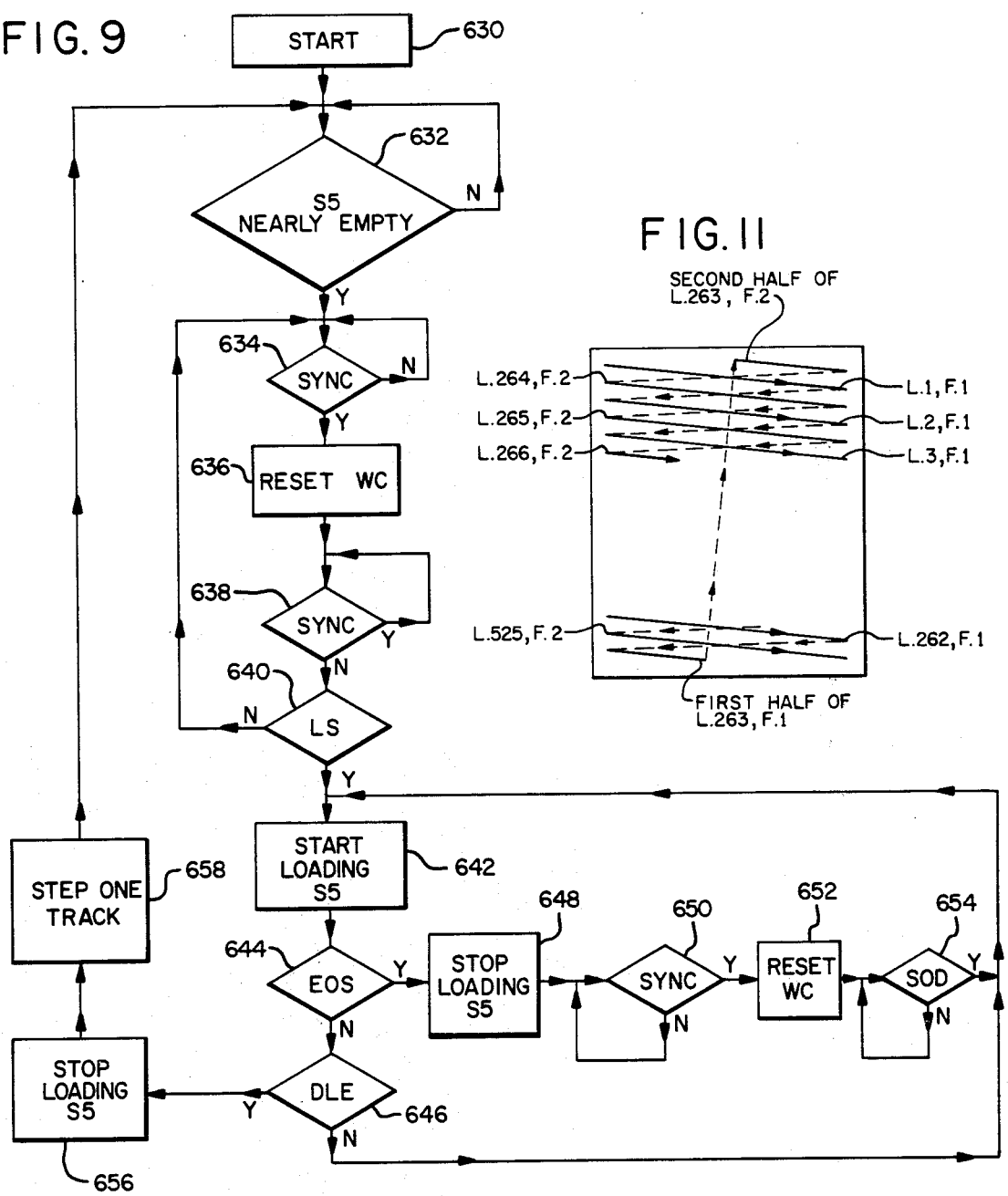
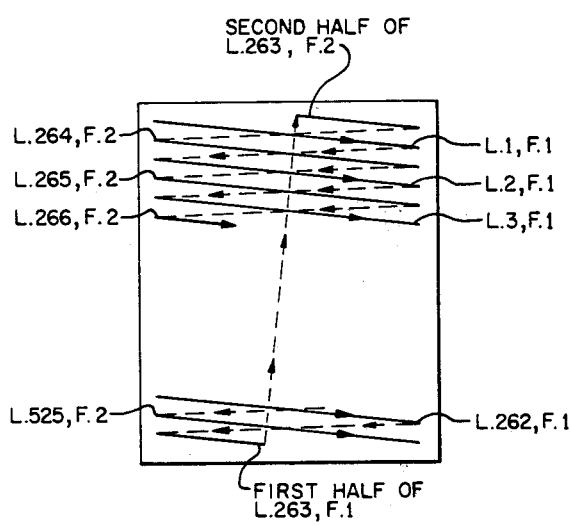
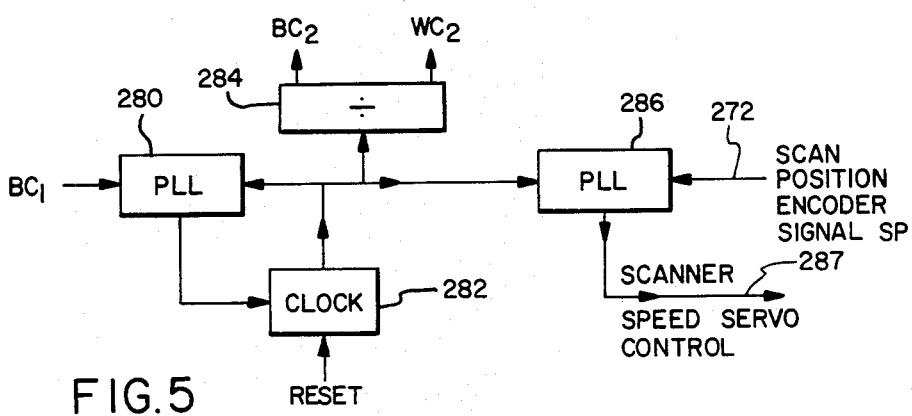

REPETITION REDUCED DIGITAL DATA RECORD AND PLAYBACK SYSTEM

BACKGROUND OF THE INVENTION

1. Field of the Invention

The subject matter of the present invention relates to a record and playback system for recording a repetition reduced digital representation of a partially repetitive signal on a data record and for playing back the data record to reconstruct the signal.

2. Description of the Prior Art

Various systems have been suggested for reducing redundant information contained in a periodic partially repetitive signal to produce a modified signal, transmitting the modified signal to a receiver, and then reconstructing the periodic signal from the received modified signal. However, most of these systems are designed to limit the bandwidth of the transmitted signal by spreading the transmission of the lesser amount of information contained in the modified signal for each period over the entire time interval of the period. Due to limitations in such systems, they generally lack the ability to transmit all the non-redundant information from the signal when successive periods of the signal change rapidly and hence contain a large amount of nonredundant information. It is common practice in these systems to simply delete nonredundant information whenever transmission of all such information is impossible. As a consequence, the resulting reconstructed signal is of low quality. In a particular, a reconstructed video signal can end up blurred or otherwise distorted. Furthermore, such systems are not designed to permanently record a data record for later replay.

U.S. Pat. No. 3,571,505 of Mounts exemplifies such bandwidth limited systems. In Mounts, "significant" frame-to-frame changes in video information of a television signal are stored in a transmission buffer memory for transmission to a receiver and subsequent insertion into a frame memory. Reconstruction of the video signal is accomplished using data stored in the frame memory. Bandwidth limitation occurs in Mounts because the amount of frame-to-frame video amplitude change in a word required before a changed word is deemed "significant" varies and depends upon the fullness of the transmission buffer. That is, until a minimum number of words have been stored in the transmission buffer, words will be stored in this buffer even though they have not changed from the corresponding words in the previous frame. The fuller the transmission memory becomes, the greater the required frame-to-frame change in video amplitude of a word before the change is considered "significant." For this reason, when the transmission buffer is almost filled, only words that have changed a large amount will be placed in the buffer. In addition, when the buffer is full, no words, regardless of the degree of change, will be placed in the buffer. Therefore, in Mounts when frames are changing rapidly, nonredundant information from the frames is not transmitted. Furthermore, when frames are changing slowly, even unchanged words are transmitted and occupy bandwidth space.

A second system for reducing redundant information in a transmitted signal is mentioned in the background section of the Mounts patent. In this system, telemetering information is transmitted from a satellite to earth at a fixed rate with each transmitted word apparently having an associated unique address. However, to enable tracking of the satellite, such a system must continuously transmit information whether or not there has been any data changes.

Another form of prior art bandwidth limited system is disclosed in U.S. Pat. Nos. 3,755,624 and 3,758,713 of Sekimoto. In Sekimoto, only "nonredundant" lines of the signal are transmitted. A line may be deemed "nonredundant" and transmitted even though most words in the line have not changed from corresponding previous words. Therefore, unchanged words in such lines will take up space in the transmission bandwidth. The Sekimoto system receives information at a high rate and transmits the nonredundant lines at a lower rate to thereby compress the bandwidth required for transmission of the signal. However, if there are too many frame-to-frame changes in the signal, then all of the changes cannot be transmitted because of the low transmission rate. As a result, Sekimoto does not transmit all of the nonredundant lines when rapid frame-to-frame changes in the signal are occurring. For this reason, the quality of the signal reconstructed from the transmitted information is impaired.

Unlike these systems, the present invention intermittently records a data record with a repetition reduced representation of a partially repetitive signal. Furthermore, this invention is not limited to a fixed bandwidth, but instead can accommodate any rate of data change without deleting nonredundant information from the recording.

Another redundancy reduced record and playback system is disclosed in U.S. Pat. No. 3,924,062 of Broadbent. Broadbent reduces the storage space used on a data record by only recording one entire frame of a plurality of consecutive frames of a television signal. On playback, the recorded frame is repeated a sufficient number of times to substitute for the omitted frames. Like the bandwidth limited systems, Broadbent suffers from the poor quality of the signal on playback because information from the omitted frames has been eliminated.

SUMMARY OF THE INVENTION

It is one object of the present invention to provide an improved record and playback system for recording a data record with a repetition reduced digital representation of a partially repetitive signal and for playing back the record to provide a high quality reconstruction of the signal.

Another object of the invention is to provide a record and playback system which reduces the amount of data record storage space needed for recording of a partially repetitive signal.

An additional object of the invention is to provide a record system which records information on selected positions of a data record.

A further object of the invention is to provide a record system which intermittently records a data record with a digital representation of a periodic signal.

An additional object of the invention is to provide a record system which records those portions of a digital representation of a periodic signal which represent period-to-period changes in the signal.

Still another object of the invention is to provide a record system which selectively records, at the end of each periodic interval of a periodic signal, either that portion of a digital representation of the signal corresponding to the period-to-period changes in the signal when no more than a predetermined amount of changes occur during the periodic interval, or the digital representation of the entire signal occurring during the periodic interval when more than the predetermined amount of changes occur.

An additional object of the invention is to provide a record and playback system which is particularly capable of producing and recording a repetition reduced digital representation of a television signal on a data record and playing back the data record.

A still further object of the invention is to provide such a system which records a digital representation of an analog signal after the analog signal has been altered to contain only selected information so that the amount of information stored on the record is reduced.

BRIEF DESCRIPTION OF DRAWINGS flag

Other objects and advantages of the present invention will be apparent from the following detailed description of certain preferred embodiments thereof, and from the attached drawings, of which:

FIG. 5 is a schematic diagram of a rate synchronization circuit used in connection with the FIG. 4 circuit;

FIG. 9 is a flow chart of the operation of the playback system of FIG. 2 in reading information from the data record to the record pickup memory;

FIG. 11 is a schematic diagram showing scanning of TV lines in a typical television signal.

DESCRIPTION OF PREFERRED EMBODIMENTS

Figure 1:
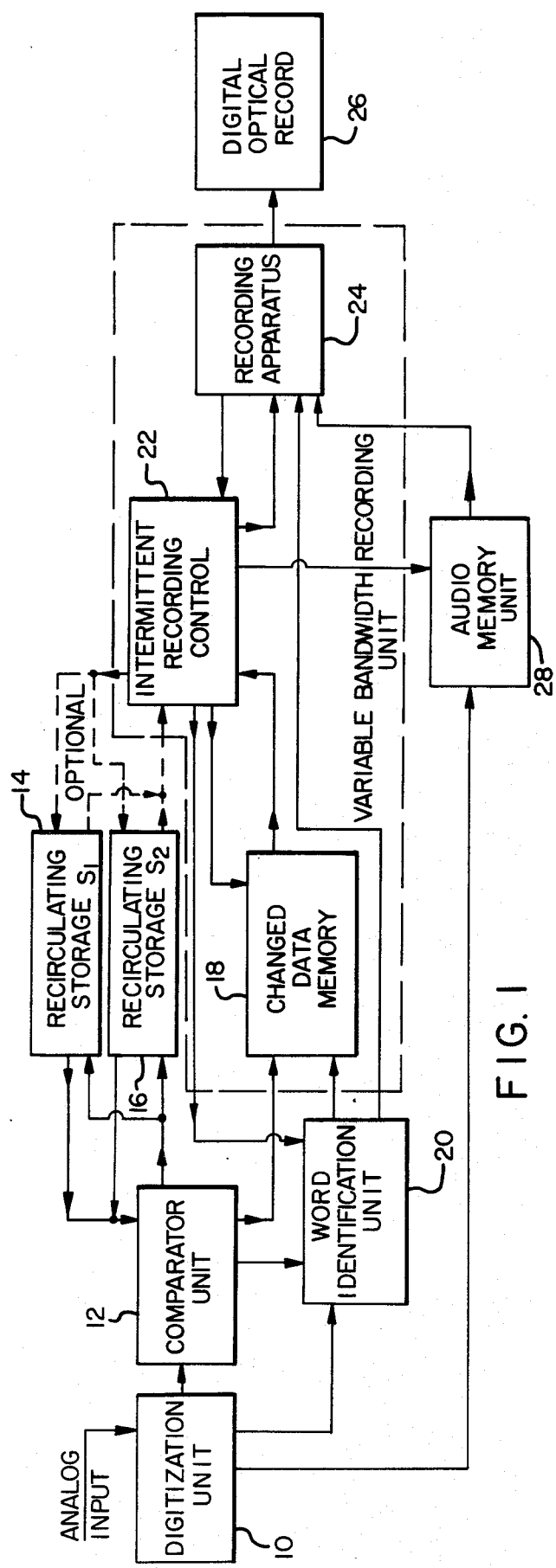
FIG. 1 is a block diagram of one embodiment of the recording system of the present invention.

One embodiment of the recording apparatus of the present invention for recording a data record with a repetition reduced representation of a partially repetitive signal is shown in FIG. 1. A digitization unit 10 is provided to receive and convert a partially repetitive and preferably periodic analog signal, such as a video television signal, into digital data elements or words and digital code words.

For purposes of facilitating the explanation, and not as a limitation, the description proceeds on the assumption that the analog input signal applied to digitization unit 10 is a conventional analog color television signal. Such a signal includes periodic time intervals which are TV frames that include a pair of interlaced fields and a vertical blanking interval at the end of each field. The fields comprise a plurality of TV lines with a horizontal blanking or flyback interval between each line. The signal also includes a horizontal synch signal at the start of each line and a vertical synch signal at the start of each field. In standard United States television systems there are 525 lines per frame and scanning of a television screen to replenish the signal on the screen occurs at 30 frames (60 fields) per second. This places the horizontal scanning rate at $30 \times 525 = 15,750$ lines per second. FIG. 11 illustrates a typical television frame showing the line number and field number for each line. Thus L.1, F.1 refers to the first line of the first field, and L.265, F.2 refers to the 265th line of the second field, etc.

In a standard television program, there is usually a high percentage of redundant or repetitive information in successive frames of the program. For example, an actor may be moving while the surrounding background occupying the bulk of the picture remains unchanged.

It is common for a television program to be taped or otherwise recorded on a data record for delayed use. However, these data records can be expensive and to record an entire television program, a large amount of data record storage space must be used. Therefore, it is desirable to reduce the amount of redundant information stored on the data record. At the same time, enough of the nonredundant information must be retained on the record to enable production of a high quality reproduction of the television program upon playback of the data record.

Referring again to FIG. 1, each data element produced by the digitization unit comprises a digital representation of the portion of the TV signal that occurs during a particular associated line time subinterval. These line time subintervals each occupy a particular position in time from the beginning of the frame that contains it.

Information from an output of the digitization unit is fed to one input of a comparator means or unit 12 which in turn has an output connected to an input of a storage means comprising, in the illustrated form, a pair of recirculating storage means 14, 16. Although the data elements stored in storages 14, 16 are not necessarily from the same frame, together these storages conveniently store a set of data elements including one data element associated with each different line subinterval of a frame. That is, the number of data elements in the set equals the number of line time subintervals in each frame. In addition, each data element of the stored set is associated with a line time subinterval at a different position in time from the beginning of a frame.

Comparator unit 12 compares received data elements from the digitization unit 10 with stored data elements applied from an output of the storages 14 or 16 to another of its inputs. The compared received and stored data elements are from different frames of the analog TV signal, but each correspond to one another in that they are each associated with a line time sub-interval located at the same position in time from the beginning of the frame containing it. If the compared received data element and compared stored data element differ by more than a predetermined value, as determined by a threshold circuit of the comparator unit, then the received data element replaces the stored data element in its recirculating storage 14 or 16. On the other hand, if the compared elements do not differ by more than the requisite amount, then the compared stored data word is returned to its recirculating storage. In this manner the set of data words stored in the recirculating storages 14, 16 is updated to contain the changed information from successive frames of the TV signal.

For reference purposes, the compared received data elements that replace the compared stored data elements in the storage means will each be called an updated data element. In addition to replacing the compared stored data elements, the updated data elements are transmitted from another output of the comparator unit 12 to an input of a changed data memory means 18 for temporary storage therein. A word identification unit 20, in response to signals from the outputs of digitization unit 10, comparator unit 12 and an intermittent recording control circuit means 22, transmits an output of position code or address data elements to another input of changed data memory means 18 for storage along with the updated data elements. From these position code elements, the position in time of the updated data elements in the analog input signal can be identified to insure proper sequencing of the elements on playback.

An output of changed data memory 18 is coupled through intermittent recording control 22 to an input of a recording apparatus 24. Also, an output from recording control 22 is coupled to still another input of changed data memory 18 for intermittently causing an output of information from this memory to recording apparatus 24 for recording on a data record 26, which may be a digital optical record.

As one example, the output from memory 18 may be caused to start at the end of each TV frame. Furthermore, the output may continue until the recording control detects that the information stored in memory 18 during the just completed frame has been transmitted to the recording apparatus. Thus, the intermittent output from memory 18 is of a varying duration. That is, following certain frames during which no changes in the signal occur, the intermittent output will be short because there will be no updated elements stored in the memory 18 for transmission to the recording apparatus. On the other hand, if the signal is undergoing rapid frame-to-frame change, then a large number of data elements will be stored in memory 18 and the intermittent output of such memory is long. Therefore, changed data memory 18, intermittent recording control 22 and recording apparatus 24 operates as a variable bandwidth recording means or unit in that the rate that data elements are recorded on the record vary over a wide range depending upon the rate of frame-to-frame changes occurring in the TV signal.

In addition, signals identifying the position on the data record where the next recording of information will occur are transmitted from recording apparatus 24 to the recording control 22. This enables the recording control to cause an output of updated data elements from memory 18 at selected times for recording on selected positions of the data record.

The number of address data elements stored in memory 18 increases with increasing numbers of updated data elements stored therein during a time interval or increment, such as a frame. When frames are changing rapidly, the total of the updated data elements and associated address elements received by memory 18 during a frame can exceed the total number of both updated and unchanged data elements from the frame stored in storages 14, 16. In such a situation, less recording space on the data record would be required to record all of the data elements from the frame stored in storages 14, 16 than to record updated data elements and associated address data elements from the frame stored in memory 18. Therefore, as an optional feature to reduce the data record storage space used during recording, an output of the storage means 14, 16, shown in dashed lines, is coupled through recording control 22 to the recording apparatus 24. Furthermore an output of the recording control shown in dashed lines, is connected to the storage means. Signals from the recording control to the storage means selectively cause an output of the stored data elements from either of the recirculating storage 14 or 16 to recording apparatus 24. In particular, such an output from storages 14 or 16 is produced whenever changed data memory 18 receives more than a predetermined amount of information during a selected time interval such as a frame. Also, the storages 14, 16 are alternately operating so that one is receiving updated data elements from comparator unit 12 while the other is producing an output to the recording apparatus and vice versa.

The recording apparatus also includes an audio memory means 28 coupled between an output of digitization unit 10 and an input of the recording apparatus 24. The audio memory receives and stores data elements representing the audio portion of the analog input signal, such as the audio television signal. Signals from recording control 22 to an input of audio memory 28 causes transmission of these stored audio data elements to the recording apparatus for recording on the data record.

Figure 2:
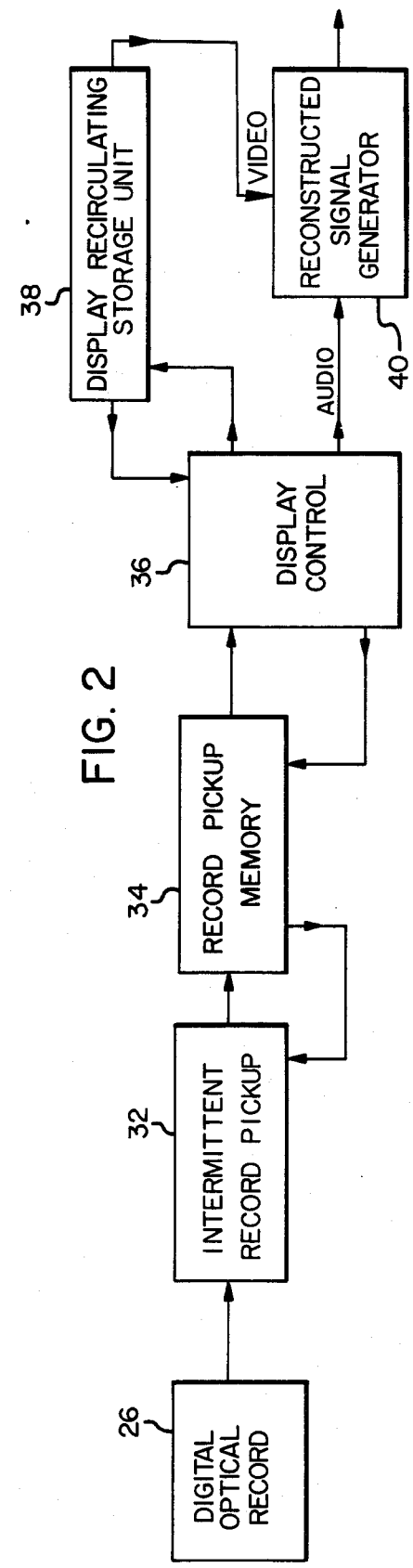
FIG. 2 is a block diagram of one embodiment of the playback system of the invention for playing back a data record produced by the recording system of FIG. 1.

One embodiment of the playback apparatus of the present invention for playing back the data record to reconstruct the analog signal is shown in FIG. 2. The playback apparatus includes an intermittent record pickup means 32 for intermittently reading information from the digital optical data record 26 to a record pickup memory means 34. A control output from record pickup memory 34 is coupled back to the intermittent record pickup 32. Signals from record pickup memory 34 at this control output occur whenever memory 34 begins to empty and cause record pickup 32 to intermittently read a preset of information from data record 26 into memory 34.

A display control means 36 is coupled to an output of record pickup memory 34 and to an input of a display recirculating storage means or unit 38. Display storage 38 receives video data elements from the display control and stores a set of such received data elements. The stored set corresponds to the set of line time subintervals of one frame of the recorded TV signal. Data elements stored in display storage 38 are each applied to a video input of a reconstructed signal generator 40 at least once during each frame of the reconstructed analog signal output which is produced by generator 40.

In addition, the stored data elements are fed from the display storage to an input of the display control. From the display control, these data elements are each returned to the display storage unless the frame and line time subinterval of a data element matches the frame, and line time subinterval of a new data element that the display control has received from memory 34. In this latter case, when they match, the data element from the display storage is replaced within the display control with the new data element and the new data element is transmitted to display storage 38 for storage therein.

Display control 36 thereupon transmits a control signal to an input of record pickup memory 34 to cause the transfer of additional data from memory 34 to the display control. In this manner, data elements in the display storage are updated so that the frame-to-frame changes in the recorded analog TV signal appear in the reconstructed signal.

Also, the display control transmits audio data elements it receives from the data record to an audio input of reconstructed signal generator 40 for inclusion in the reconstructed signal.

Generator 40 converts the data elements it receives into a high-quality reconstructed version of the TV signal that was recorded by the recording apparatus on the data record.

DIGITIZATION UNIT

The digitization unit 10 of FIG. 1 will be described with reference to FIG. 3. The television program horizontal synch signal is fed to an inverter 43 input of an AND gate 44 and turns off gate 44 for the duration of the synch signal. The horizontal synch signal is also fed to the inputs of another AND gate 46, an alternate line flip-flop 48, a start of frame detector 50 and a phase lock loop 52. A clock pulse generator 54 is connected to an output of phase lock loop 52 and also has a feedback output connected from such clock generator to an input of the phase lock loop. Clock pulse generator 54 produces an output of bit clock pulses BC1 and includes a pulse counter for dividing the BC1 pulses by the number of bits per word, for example four, to produce an output of word clock pulses WC1. In addition, generator 54 also produces from the BC1 pulses an output of audio sampling pulses 2XH at twice the horizontal frequency rate. The phase lock loop 52 supplies a correction voltage signal to clock 54 whenever it determines that the clock and the horizontal synch signal deviate from synchronism. The operation of phase lock loop 52 is conventional and it serves to maintain the BC1, WC1 and 2XH outputs of generator 54 in synchronism with the horizontal sync signal of the television program source.

An output of alternate line flip-flop 48 is connected to an output of gate 46 and also to an inverter 47 input of gate 44. Flip-flop 48 is alternately triggered between its positive and zero states by the horizontal synch signals. Thus, assuming the output from flip-flop 48 is positive, it remains positive until it is reverted to zero upon the occurrence of the next horizontal synch signal. In this manner, a positive signal from flip-flop 48 turns on gate 46 for the duration of every other line of each pair of lines of the TV signal. At the same time that gate 46 turns on, gate 44 is off due to its inverter input 47. On the other hand, during TV lines following the lines during which gate 48 is on, the output from flip-flop 48 reverses so that gate 46 is disabled while an enabling signal appears at gate 44 from inverter 47.

As explained below, the output from gate 44 causes sampling of the video portion of the television signal with the sample output signals subsequently being digitized. Thus, by shutting off gate 44, alterate line flip-flop 48 allows digitization of data only from alternate lines of the television program. Referring to FIG. 11, a TV frame signal has an odd number of lines, alternate line flip-flop 48 causes the sampling and digitization of data words from odd television lines 1, 3, 5, etc., during first or odd frames of pairs of frames while during second or even frames the even lines 2, 4, 6, etc. are sampled and digitized. Therefore a group of data samples comprised of a data element associated with each line time subinterval in a frame is produced during each pair of odd and even frames. One-half of the group is produced during the odd frames and the other one-half of the group is produced during the even frames.

It has been found that deletion of every other television line, by not digitizing it, still preserves a sufficient amount of information from which the television signal can be reconstructed without significantly distorting the reconstructed signal. However, should a still higher quality version of the reconstructed signal be desired, then alternate line flip-flop 48 is eliminated. This permits digitization of each television line of the source program.

Returning to FIG. 3, to prevent sampling from occurring during the vertical synch signal, the television program vertical sync signal is fed to an inverter 49 input of AND gate 44 to disable this gate for the duration of the synch signal. In addition, the vertical sync signal is also transmitted to inputs of start of frame detector 50 and a divide by two divider 56 for use in producing code elements as explained below.

Gate 44 also receives the WC1 pulses at another of its inputs. When so connected, gate 44 is off during every other line of the television signal and also during the program horizontal and vertical synch signals. At other times, gate 44 is on and the WC1 pulses appear as video sampling pulses at the output of gate 44. These video sampling pulses are transmitted to a sampling input at each of three sample and hold circuits 58, 60, 62. The luminance component Y of the analog color television signal is separated from the composite TV signal in a well-known manner and fed to an input of sample and hold circuit 58. Similarly, the chrominance components I and Q of the color television signal are separated from the composite TV signal and transmitted to inputs of sample and hold circuits 60, 62, respectively.

In response to the sampling signal from gate 44, the sample and hold circuits each sample the video component Y, I or Q of the color television signal applied to its input and transmits the resulting sample output to a multiplexor 64 wherein the samples are arranged in a desired sequence to form data words or elements. U.S. patent application Ser. No. 679,005 of James T. Russell, filed Apr. 21, 1976, now Pat. No. 4,050,811, discloses in more detail a digital color television system that may be employed in the present invention for reducing the amount of video information that is digitized. For example, the digital data words can be formed of three bits of Y information followed by either a bit of I or Q information with the I and Q bits forming a part of alternate words. On playback, the luminance and chrominance components can be combined in a manner explained in such prior Russell application to reconstruct a signal containing luminance and both chrominance components. These data words are converted by an analog-to-digital converter 66 into digital data words and appear at a video data output 68 of the digitization circuit 10.

In addition to the video data output 68, digitization unit 10 produces a number of code signals for use in recording and playing back the data record as described below. First, an end of television line signal EOL is produced at the output 70 of gate 46 at the end of the television lines that are digitized into data words. One input to gate 46 is positive during each television program horizontal synch signal and the other input to this gate, from flip-flop 48, is positive during the TV line following the TV line that was sampled by the output from gate 44. Thus, the EOL signal on line 70 has a duration of the horizontal synch signal and occurs at the end of those lines that are sampled.

A second code signal, FS, the television program frame start signal, is produced on line 72 by detector 50 at the start of each frame of the program. One suitable frame start detector 50 includes a divide by two circuit (not shown) which receives the pair of vertical sync signals for the two fields of each frame and produces an output during the second vertical sync signal at the end of each television frame. This output is delayed and then fed to an input of an AND gate (not shown) which gate receives at its other input the horizontal sync signals. Because it has been delayed, the second vertical sync signal of each frame and the horizontal sync signal at the start of the next frame are fed to this latter AND gate at the same time. Thus, a FS signal is produced by detector 50 at the start of the line following the second vertical blanking interval of each frame which is at the start of the next frame.

Another code signal, FE, the frame end signal, is produced by divider 56 on line 74 during the second vertical sync signal of each frame. Divider 56 is reset by each FS signal received at one of its inputs from line 72.

Also, an end of field EOF signal appears on a line 76 during each vertical sync signal. Thus, the EOF signal follows the completion of each video field of the television program.

Additionally, the FS signal is fed from line 72 to a triggering input of a flip-flop 78 which in turn produces an alternate frame, AF, signal at its output on line 80. The AF signal is fed to a reset input of alternate line flip-flop 48 so that when AF turns positive, flip-flop 48 is set to produce a positive output. Thus, AF is positive when each even frame is being digitized. As a result, flip-flop 78 produces a positive AF output during each even frame of the program when even numbered lines are being digitized and is its zero state to produce a null output during each odd frame of the program when odd numbered lines are being digitized. Instead of triggering flip-flop 78 with the FS signal, it may be triggered from the EOF signal on line 76 so that the AF signal becomes an alternate field signal. This approach is used in those applications wherein each television program line is to be converted into data elements.

Digitization unit 10 also includes a stereo audio digitization portion having a pair of sample and hold circuits 82, 84 which each receive a channel of audio information from the television program source. Circuits 82, 84 each sample their respective audio inputs at twice the horizontal frequency rate in response to the 2XH sampling pulses transmitted to a sampling input of these circuits from clock pulse generator 54. The audio sample outputs of the sample and hold circuits are multiplexed by a multiplexor 86 in a conventional manner. Thereafter an analog to digital converter 88 converts the output of audio information from multiplexor 86 into digital audio data elements.

The digital audio data elements are transmitted from analog to digital converter 88 to an input of a parity assign circuit 90 which operates in a well-known manner to assign a parity bit to each audio data element. These parity bits enable the detection of and compensation for errors in audio data elements upon playback of the data record. For example, one possible parity circuit counts the number of positive bits in each audio element. If this number is even, a positive bit is placed in a parity bit position at the end of the element and if the number is odd, a zero is placed in the parity position. On playback, the number of positive bits in the audio data element are counted and determined to be odd or even. This determination is then checked against the oddness or evenness expected from the parity bit. If the oddness or evenness of the number of positive bits read from the record does not match the parity bit expectation, an error is indicated. One way of compensating for such errors is to repeat the previous audio data element instead of using the erroneous audio data element.

Figure 3:
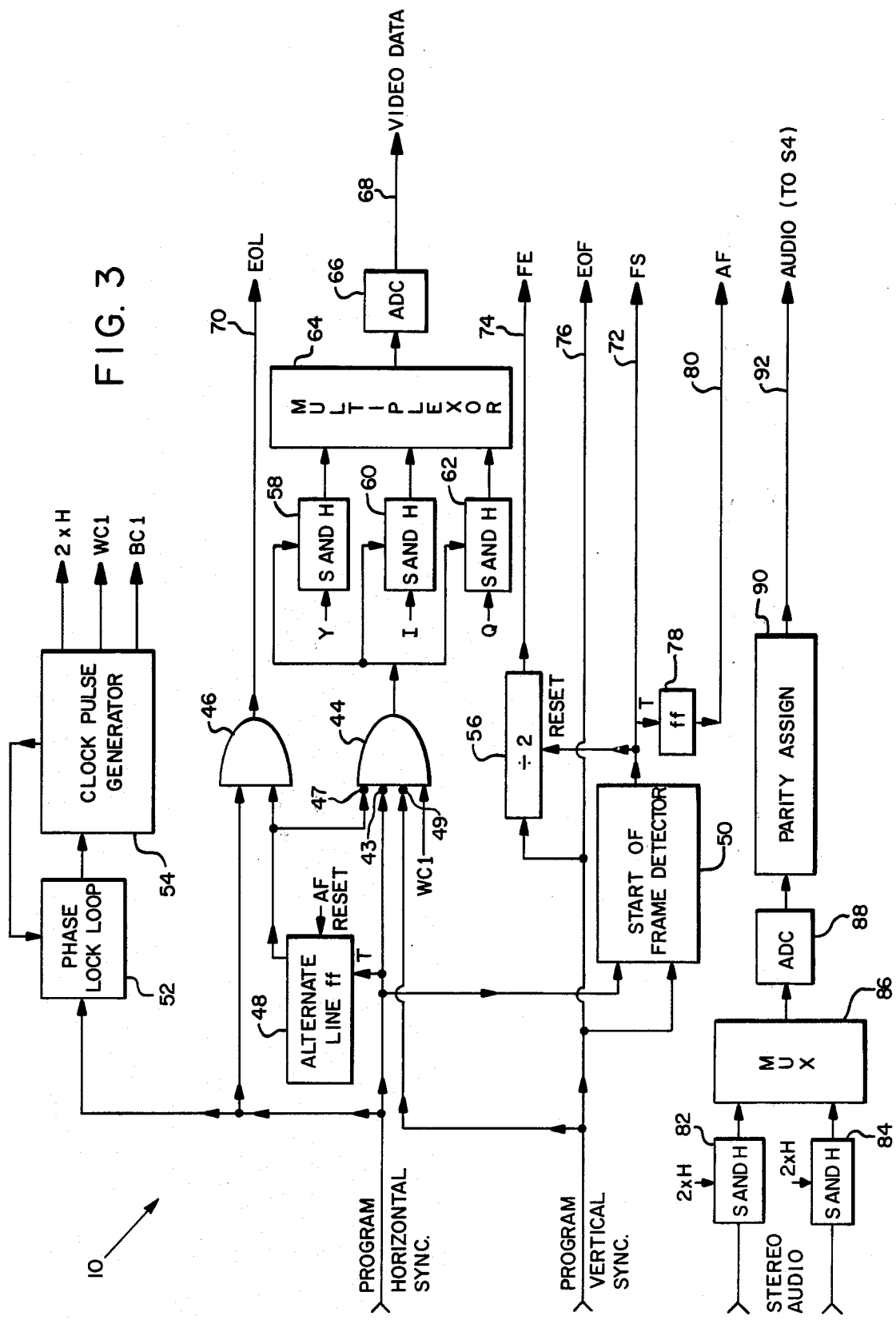
FIG. 3 is a schematic diagram of the electrical circuit of one embodiment of the digitization unit in the system of FIG. 1.

For purposes of reference throughout the description, the following table summarizes some of the symbols utilized in FIG. 3:

TABLE I

2XH: Sampling pulses at twice the horizontal television program frequency rate.
WC1: Word clock pulses from the first word clock.
BC1: Bit clock pulses from the first bit clock
EOL: End of television program line signal
FE: End of television program frame signal
EOF: End of television program field signal
FS: Start of television program frame signal
AF: Alternate television frame signal

COMPARATOR UNIT

Figure 4:
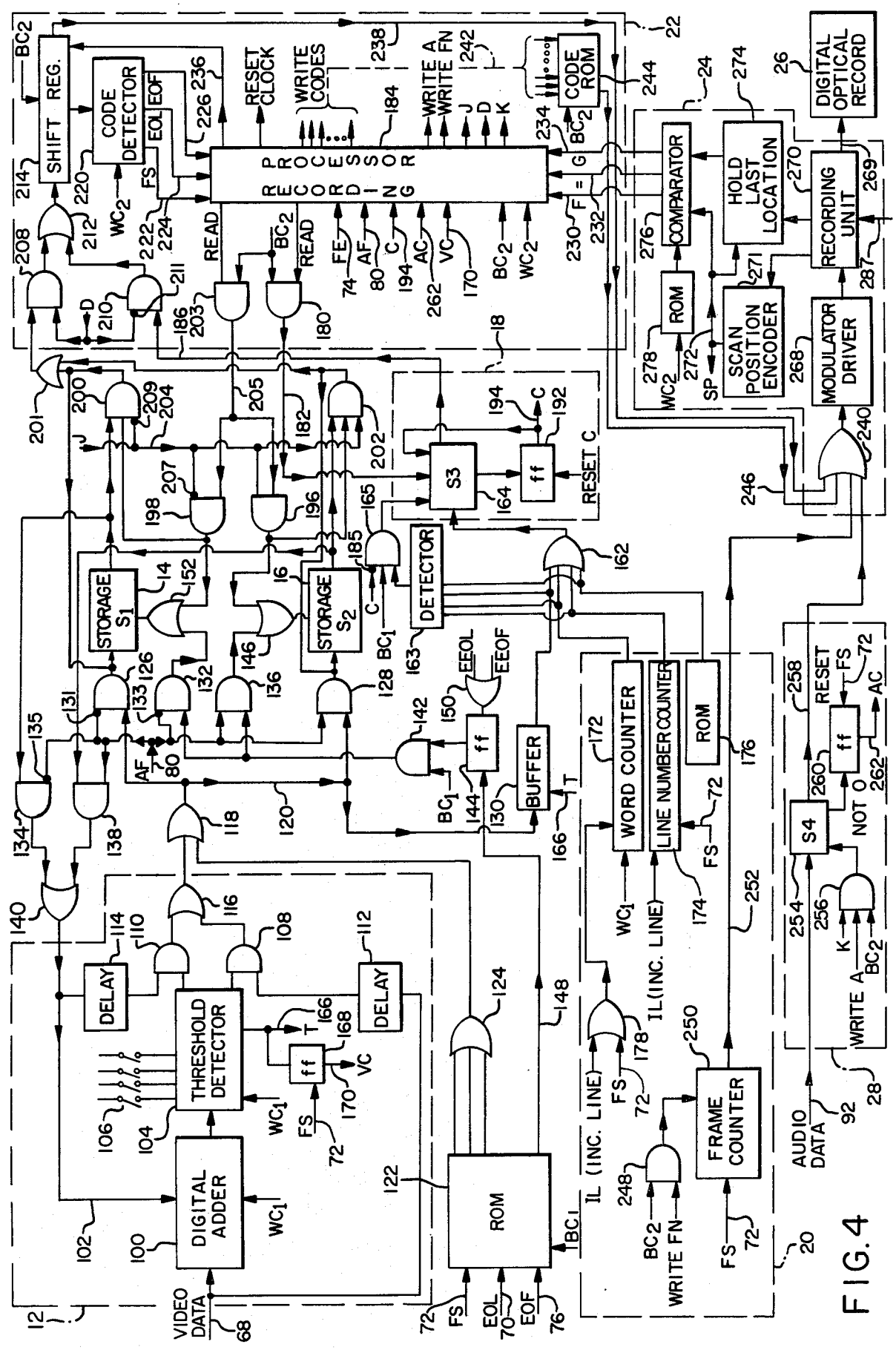
FIG. 4 is a schematic diagram of the electrical circuit of the recording system of FIG. 1 with the digitization unit deleted.

The comparator unit 12 in the system of FIG. 1 is shown in greater detail in FIG. 4 and includes a digital adder 100 which receives at a first input the digital video data elements or words from line 68 of digitization unit 10. Adder 100 also has a second input 102 that receives data elements or words from the recirculating storages 14, hereafter called $S_1$, and 16, hereafter called $S_2$. The adder 100 includes a complement circuit at one of the two inputs so that the adder causes a received data word from line 68 to be subtracted from the stored data word on line 102 to produce a digital difference output signal equal to the numerical difference between the two inputs. As explained below, comparator unit 12 and storages $S_1$, $S_2$ operate in synchronism, so that each data word is received by the comparator unit on line 68 from the digitization unit. At the same time the corresponding stored data word from the storages is received by the comparator unit on line 102. By corresponding, it is meant that the compared received data word from line 68 and compared stored data word from line 102 both represent the TV signal occurring at a line time subinterval at the same position in time from the beginning of a frame. However, the compared received data word is from a frame following the frame containing the compared stored data word.

Following the comparison of each pair of words, the difference signal is clocked by WC1 pulses applied to adder 100 and from such adder to an input of a threshold detector 104. The threshold detector has one input connected to the output of adder 100 and another input connected to threshold setting switches 106. Switches 106 are selectively operated to produce a desired digital threshold signal which is compared with the numerical value of the difference signal output of adder 100. Once adjusted to a given level, the switches are normally left unchanged so that the threshold signal remains fixed while the program is recorded.

The threshold subtractor circuit compares the magnitude of the difference signal from adder 100 with the threshold level set by switches 106 to determine if it is above or below such threshold. If the difference signal equals or exceeds this level, then a positive output signal having the duration of a data word is clocked by WC1 pulses to an input of detector 104 to an input of an AND gate 108. On the other hand, if the difference signal is less than the threshold level, a similar positive output signal is clocked from threshold detector 104 to an input of an AND gate 110.

The video data words from line 68 are also fed through a delay circuit 112 to the other input of gate 108. Also, the stored data words from line 102 are fed through a delay circuit 114 to the other input of gate 110. These delay circuits delay the data words a sufficient amount of time to enable adder 100 to compare these words and cause threshold detector 104 to produce an output to either gate 108 or gate 110 at the same time that the delayed words appear at these gates. Thus, if the difference between the compared received data word and compared stored data word does not exceed the threshold level, gate 110 conducts and the compared stored data word is fed from gate 110 to an input of an OR gate 116. From gate 116 the stored data word is transmitted through an OR gate 118 to a line 120 for return, as explained below, to the storage $S_1$ or $S_2$ that originally contained it.

However, if the difference signal equals or exceeds the threshold level, the output of the threshold detector 104 causes gate 108 to conduct so that the compared received word is transmitted from delay 112 through gates 108, 116 and 118 to line 120. From line 120 this compared received data word is transmitted to the storage $S_1$ or $S_2$ that previously contained the compared stored word data. Therefore, the compared received data words that differ from the compared stored data words, and may be considered updated data words, replace compared stored data words in their storages $S_1$ or $S_2$ to update the stored information.

As shown in FIG. 4, outputs 70, 72 and 76 from digitization unit 10 are connected to inputs of a read only memory 122 for transmission of the EOL, FS and EOF signals, respectively, to the ROM. When the EOL signal is received by ROM 122, a BC1 input to such ROM causes the ROM to transmit an EOL code word output to an OR gate 124 and on to OR gate 118. From gate 118, the EOL code word passes to line 120 for reading into either storage $S_1$ or storage $S_2$. In the same manner, when ROM 122 receives the FS and EOF signals, they are clocked by BC1 to the outputs of the ROM, as FS and EOF code words respectively which are fed through gates 124 and 118 to line 120.

Recirculating Storages

Line 120 is connected to the recirculating storages $S_1$ and $S_2$ through inputs of an AND gate 126 and an AND gate 128. Line 120 is also connected to a buffer memory 130. The AF signal on line 80 of digitization unit 10 is fed to an inverter input 131 of gate 126 and also to inverter inputs 133, 135 of a pair of AND gates 132 and 134. In addition, the AF signal is fed to an input of gate 128 and also to inputs of AND gates 136 and 138.

The output of gate 126 is connected to an input of storage $S_1$ whose output is connected to another input of gate 134. Also, the output of gate 128 is connected to an input of storage $S_2$ whose output is connected to another input of gate 138. The outputs of gates 134, 138 are connected to inputs of an OR gate 140 which transmits the storage outputs to line 102.

The BC1 signal is fed through an AND gate 142 to gates 132 and 136. The other input of gate 142 is connected to an output of a flip-flip 144. Normally, the flip-flop output is positive so that gate 142 conducts and the BC1 signal is fed to inputs of gates 132 and 136.

During even frames, as previously described, AF is positive so that gates 126, 132 are off because of inverters 131, 133 and gate 136 conducts to transmit the BC1 signal from gate 142 through an OR gate 146 to a triggering input of storage $S_2$. This causes stored data words to be read in series from storage $S_2$ to gate 138. Since AF is positive, gate 138 also conducts these data words through gate 140 to line 102 for comparison in the comparator unit 12. Then, as determined by comparator unit 12, either the compared stored data word or the updated data word at the outputs of gates 110 and 108, respectively, is fed on line 120 to gate 128 which transmits the word into storage $S_2$. This process is repeated until such time as an EOL signal appears at ROM 122.

The EOL code word from ROM 122 passes through gates 124, 118 and 128 into storage 16. However, the EOL code word occupies less time than the horizontal sync signal and accompanying horizontal blanking interval. Therefore, to save storage space, storage $S_2$ is turned off between the end of the EOL code word and the end of the EOL signal on line 70. This is accomplished as follows. ROM 122 transmits a triggering output to flip-flop 144 on a line 148 at the end of the EOL code word. This triggering output resets flip-flop 144 to produce a zero output to gate 142 and turn off this gate. When gate 142 is off, the BC1 input to storage $S_2$ is blocked and it ceases operation. An end of EOL signal (EEOL) is derived from the falling edge of the EOL signal on line 70 and is fed through an OR gate 150 to flip-flop 144 and resets the flip-flop to its positive output state. This in turn causes gate 142 to begin conducting and restarts storage $S_2$ after the horizontal blanking interval ends.

Eventually an EOF signal is fed via line 76 to ROM 122. The resulting EOF code word from ROM 122 passes through gates 124, 118 and 128 into storage $S_2$. The EOF code word occupies less time than the vertical sync signal and accompanying vertical blanking interval which it represents. For this reason, $S_2$ is stopped between the end of the EOF code word and end of the EOF signal. To accomplish this, a signal is transmitted from ROM 122 on line 148 at the end of the EOF code word. This signal triggers flip-flop 144 into its zero state and turns off gate 142 to thereby turn off second storage $S_2$. An end of EOF signal (EEOF), derived from the falling edge of the EOF signal on line 76, is fed via gate 150 to flip-flop 144 and triggers the flip-flop to its positive state at the end of the EOF signal. This enables gate 142 and restarts $S_2$ after the vertical blanking interval ends.

At the start of the next frame, an odd frame, AF goes to its zero state causing gates 128 and 136 to turn off. At the same time, gates 126 and 132 are turned on because of inverters 133, 136. Thus, when gate 142 conducts, the BC1 signal is fed from its output through conducting gate 132 and to an OR gate 152. The output of gate 152 is transmitted to first storage $S_1$ to cause data to be read out of and into this storage in the same manner as the output of gate 146 operates $S_2$.

Also, at the start of the next frame, an FS signal is transmitted on line 72 to ROM 122. In response thereto, ROM 122 transmits an FS code word to gates 124, 118, 126 and into storage $S_1$. Thereafter, data words are transmitted out of storage $S_1$ to gates 134, 140 and line 102 for comparison in comparator unit 12.

Storage $S_1$ continues operating in the same manner as described above for storage $S_2$ until such time as the next AF signal occurs and $S_2$ again starts operating.

Although storages $S_1$ and $S_2$ can be random access memories, they are preferably recirculating memories. Furthermore, they are each sized to hold a set or group of data words corresponding in number to the number of data words and associated FS, EOL and EOF code words of one-half of a frame. These one-half a frame sets, since alternate TV lines are being digitized, comprise data from odd lines of frames in $S_1$ and from even lines of frames in $S_2$. However, if each TV line is digitized, the one-half frame sets would comprise data from first fields of frames in $S_1$ and second fields of frames in $S_2$. In other words, the TV lines represented by the group of data stored in $S_1$ are at different positions in a frame than the lines represented by the group stored in $S_2$. Thus, using storage $S_1$ as an example, it receives the FS code word followed by the first data word of the first odd line, line 1. The second data word of the first line follows, then the third data word, etc., through an EOL code word indicating the end of line 1. Thereafter, lines 3, 5, etc. follow until eventually the first EOF code word occurs indicating the end of the first field of the odd frame.

As storage $S_1$ is being updated, it will contain data words from two frames, that is, data words entered during a prior odd frame that have not yet been compared in comparator unit 12 as well as data words from the current odd frame that have been compared.

While storage $S_1$ is updated, storage $S_2$ contains data from the previous even frame. Therefore, at such time the storages contain data from three frames, the prior odd frame, the prior even frame and current odd frame. On the other hand, at the end of the current odd frame the storages contain data from two frames, the prior even frame and just completed odd frame.

The remaining odd lines of the second field of the frame and second EOF code word of the frame follow in succession after the first field of the odd frame. Following the loading of the second EOF code word into $S_1$, this storage is full. This means that the FS code word is in position to be read out from the storage when $S_1$ next operates.

Thus, at the start of the next odd frame, the FS signal passes from storage $S_1$ to comparator unit 12. However, since no corresponding code word is received by adder 100 on line 68, the threshold detector 104 does not trigger the return of this FS code word to storage $S_1$. Instead, a new FS code word from ROM 122 goes through gates 124, 118 and 126 to the input of storage $S_1$ and assumes the position in the sequence of data stored therein formerly occupied by the previously stored FS code word. In this manner, errors in the FS code word stored in $S_1$ are minimized as the FS code word is refreshed each frame. Following the FS word, the stored first data word in line 1 goes from $S_1$ to adder 100 and is compared with the first data word of the first line of the next odd frame at input 68. Thereafter, either the compared stored first data word or the updated first data word is stored in storage $S_1$ following the FS signal. The EOL and EOF code words are treated in the same way as the FS code word. Therefore, the data words in successive odd frames that change from the corresponding data words of a prior odd frame update the information in storage $S_1$ so that the data words in $S_1$ represent the most recent odd frame of the television program.

Storage $S_2$ operates in the same manner during even frames so that it is updated to represent the most recent even frames of the television program.

Information is therefore read into storages $S_1$, $S_2$ in the followng sequence: FS/DATA WORDS/EOL/DATA WORDS/EOL/.../EOF/DATA WORDS/EOL.../EOF/FS.... Furthermore, the periodic nature of the television source program insures that comparison is made between data words from line subintervals at the same position in a frame.

It should be pointed out that initially, when storages $S_1$ and $S_2$ are empty, comparator unit 12 is comparing a null signal from these storages with the video data words from line 68. As a result, the threshold level will be exceeded for each of these data words so that $S_1$ and $S_2$ are filled with data and code words from the first odd and even frames of the television program. Following this initial filling, these storages are merely updated as explained above.

If every line of the television source program, instead of alternate lines, were digitized, the AF signal would switch with each field. This would cause storage $S_2$ to receive data and code words representing first fields of frames and storage $S_1$ to receive data and code words representing second fields of frames. Otherwise, storages $S_1$ and $S_2$ would operate in the same manner as described above. However, while $S_1$ is being updated by data from the first field of a current frame, $S_2$ would contain data from the second field of a prior frame. Furthermore, at the end of each frame, $S_1$ and $S_2$ would contain the data from the two fields of said each frame.

CHANGED DATA MEMORY AND WORD IDENTIFICATION UNIT

As previously mentioned, data words and the FS, EOL and EOF code words are transmitted on line 120 to an input of a buffer memory 130. Buffer 130 holds a single word and has its output connected through an OR gate 162 to a changed data buffer memory 164, hereafter called $S_3$, in the changed data memory means 18. Buffer memory $S_3$ may be of the first-in-first-out type.

Threshold detector 104 produces a triggering signal T on a line 166 whenever the difference signal produced by adder 100 exceeds the threshold level set by switches 106 within detector 104. Hence, the signal T occurs only with the presence of updated data words and does not occur when unchanged stored data words are returned to their storage. Line 66 is connected to a loading input of buffer 130 so that in response to the triggering signal T, only updated data words are loaded into buffer 130 from line 120. The FS, EOL and EOF code words are also loaded into buffer 130 in a similar manner when they occur. A flip-flop, not shown, can be connected to input 166 of buffer 130 and triggered for the duration of these code words to be used for loading of these code words into buffer 130.

For purposes explained below, line 166 is also connected to a flip-flop 168 of comparator unit 12 to trigger this flip-flop and cause it to produce a positive video change output signal VC on an output line 170 whenever the first updated data word of a frame occurs. This video change output VC indicates that a video change is present in a frame, and remains positive until the next FS signal which reverts flip-flop 168 back to its zero state.

The words fed into buffer 130 are temporarily stored therein until they are loaded into changed data memory S3 in proper sequence with word position identifying code words from word identifying circuit 20 as described below. On playback, the position of the updated data words in the television program can be determined from these position words.

Changed data memory S3 is loaded in response to output signals it receives from an AND gate 164. Gate 165 receives the BC1 signals at one input and receives an output of a data presence detector 163 at another input. Detector 163 receives the outputs of buffer 130, and of a word counter 162, a line counter 174 and a ROM 176 of the word identification unit 20. Detector 163 produces a positive signal to gate 165 whenever any data is transmitted to any input of gate 162. Assuming for the moment that there is no third input (labeled C in FIG. 4) to gate 165, then this positive signal from detector 163 enables the transmission of the BC1 signal through gate 165 to changed data memory 18 to cause loading of the output of data from gate 162 into memory S3. At the same time, gate 165 is off whenever there is no data present at gate 162. Data entering memory 164 moves through the memory until it reaches the position in the memory adjacent to the position containing previously stored data.

The outputs of word counter 172, line number counter 174 and ROM 176 in the word identification unit 20 are coupled through OR gate 162 to an input of storage S3. Line counter 174 produces code words indicating the line number of updated data words, word counter 172 produces words indicating the word number in a line of updated data words and ROM 176 produces code words indicating that a series of updated data words from a successive line time subintervals of the same line have ended.

An increment line signal IL, derived from the falling edge of each EOL signal on line 70 is fed to an input of an OR gate 178 having its output connected to a reset input of word counter 172. The other input of gate 178 receives the FS signal from line 72 of digitization unit 10. The output from gate 178 resets word counter 172 to zero at the end of each horizontal line of the television source program and also at the start of each frame of the program. After being reset, word counter 172 counts words of each horizontal television line from one to the maximum number of words in the line in response to the WC1 signals it receives at one of its inputs. A control signal input, not shown, derived from the triggering signal T on line 166 causes the transmission of the word count contained in counter 172 in the form of a word number code, WN, to gate 162 when needed to identify an updated data word stored in S3. Line counter 174 is reset to one at the start of each frame in response to the FS signal which it receives from line 72 of the digitization unit and is incremented each time it receives the IL signal at another of its inputs. Therefore, line counter 174 counts the line numbers of the television signal being compared by comparator unit 12. A line count output from counter 174 in the form of a line number code word, LN, is transferred to gate 162 in response to a control signal derived from the signal on line 166 when needed, to identify an updated data word. Finally, when needed, as explained below, an end of video change code word, EOC, is transferred from ROM 176 to gate 162.

When the FS code word is received by buffer 130 it is fed to gate 162 and read into memory S3. Assuming that there are no changed or updated data words in the first line following the FS code word, then nothing is loaded into S3 until the EOL code word at the end of this first line. Next, assume that the sixth word only in the following line has changed. This sixth word is held in buffer 130 until its line number from counter 174, followed by its word number from counter 172 are loaded in S3. Thereafter, the sixth word is loaded into S3. Since no further changes occur in the line, the EOL code word will next be loaded into S3. Now assume in the next line a series of successive words (i.e. words three, four and five) are updated data words. The line number code and third word code is loaded into S3 followed by the third word. However, instead of loading line number and word number codes for the fourth and fifth words, the fourth and fifth words are loaded in S3 immediately following the third word. Thereafter, an end of change code word EOC is loaded from ROM 176 into S3. In this way the word identification unit produces a first position code word, WN, associated with the first updated data word of a series of updated data words from successive TV line time subintervals. In addition, the word identification unit produces a second position code word EOC indicating the last data word of a series. This second position code word can be positioned at various locations in the data on the record. For example, it may be placed after the first position code word to indicate how many words of the series follow. However, preferably it is placed following the last data word of the series. Thus, the amount of storage space utilized in S3 is reduced because certain of the LN and WN code words associated with successive changed data words are not loaded into S3.

One example of a data sequence in S3 may be as follows: FS/EOL/LN/WN/DATA WORD/EOL/LN/WN/DATA WORD/DATA WORD/DATA WORD/EOC...EOL...EOF...EOF/FS.

Changed data memory S3 may be made large enough to store each data word and associated position code words of an entire even or odd frame in the unlikely event that each word of such a frame changes. As a result, none of the changed data information of a frame from comparator unit 12 will be lost due to storage capacity limitations of storage S3.

INTERMITTENT RECORDING CONTROL

The intermittent recording control 22 includes an AND gate 180 having an output coupled by a line 182 to an input of changed data memory S3. One input to gate 180 comprises a second bit clock signal BC2 which is obtained and synchronized to BC1 in a manner that will be explained in connection with FIG. 5. The other input of gate 180 receives a read signal from a recording processor 184 in intermittent recording control 22.

This read signal occurs from timetotime, and preferably periodically at the end of either fields or frames of the television signal. In the illustrated embodiment, due to the alternate line digitization being employed, this signal will be generated at the end of each frame of the television program. During the read signal, the BC2 signal is transmitted to S3 and causes an output of the data stored in S3 during the just completed frame, on a line 186 to the intermittent recording control 22 for subsequent recording by recording unit 24.

As the number of changed data words in a frame increases, the amount of address information stored in S3 also increases. At a certain level of changes, the number of updated data words and associated address words stored in $S_3$ during a frame would exceed the total number of video data words, FS, EOL and EOF code words stored in either $S_1$ or $S_2$. Thus in such cases, it would require less space on the data record to record the contents of $S_1$ or $S_2$ than to record the updated data words and address words from the frame stored in $S_3$. It has been found that $S_3$ can be reduced in size to contain updated data words and address code words representing less than a full frame (i.e. 25%) and still will be large enough to handle the frame-to-frame changes from most frames without filling. That is, few frames have video data changes of more than twenty-five percent from a preceding frame.

However, distortion in the television signal could occur if information from the few frames having large changes, i.e. greater than 25%, were simply deleted. Therefore, as an option of the illustrated embodiment, the memory $S_3$ is reduced in size to accommodate less than a full frame of frame-to-frame change in data. At the same time, a selective read out option is provided for reading out the contents from either $S_1$ or $S_2$ to the recording control 22 in the event a particular frame has more updated data words than the reduced $S_3$ can accommodate.

As a part of this selective read out option, changed data memory $S_3$ produces an output to a flip-flop 192 whenever $S_3$ receives more than a predetermined amount of data during a frame (i.e. becomes full). This output triggers flip-flop 192 and causes it to produce a positive output C on a line 194. The C signal thereby indicates that $S_3$ could not hold all of the updated data words and associated address words from a frame. In addition, the C signal indicates that data for this frame should be read from either $S_1$ or $S_2$, whichever was updated during this frame by data from comparator unit 12. This C signal is fed to a recording processor 184 of intermittent recording control 22 and to an input of memory $S_3$ to clear the memory of data contained therein. Output signal C is also fed to an inverter 185 input of gate 165 to turn off this gate and prevent additional data from being stored in memory $S_3$ during the remainder of the frame. After $S_3$ fills, flip-flop 192 is reset at the end of each frame to cause the output C to return to zero.

Among its other functions, recording processor 184 controls the input of data from $S_3$ (or $S_1$ or $S_2$ if $S_3$ is full) to recording apparatus 24 and, furthermore, controls this input so that it will occur when the recording apparatus is ready to record data on selected positions of the data record 26.

The following circuitry is utilized to read the contents of either $S_1$ or $S_2$ to recording processor 184 following frames during which $S_3$ fills. That is, following even frames during which $S_3$ fills, the recording control 22 causes the contents of $S_2$ to be read. Similarly, following odd frames during which $S_3$ fills, the read out of the contents of $S_4$ is caused by recording control 22.

An AND gate 203 of recording control 22 receives the BC2 at one input and a read signal from recording processor 184 at another input. This read signal occurs following frames during which $S_3$ has filled. In addition, it lasts until the contents of $S_1$ (if the just completed frame was odd) or of $S_2$ (if the just completed frame was even) has been read from such storage to recording control 22. During times when this read signal occurs, the BC2 signal is transmitted on line 205 from gate 203 to a common input of AND gates 196 and 198. The output of gate 198 is connected through gate 152 to storage $S_1$. In addition, the gate 198 output is coupled to an input of an AND gate 200. Also the output of storage $S_1$ is coupled to an input of AND gate 200 which in turn has its output connected to an OR gate 201 and to the input of $S_1$. Thus, when gates 203 and 198 conduct, the contents of $S_1$ are read through gates 200 and 201 to recording control 22. At the same time the data from $S_1$ appearing at the output of gate 200 is returned to the input of $S_1$ for storage therein so that $S_1$ does not empty. Similarly, the output of gate 196 is coupled through gate 146 to storage $S_2$ and is also connected to an input of an AND gate 202. In addition, the output of storage $S_2$ is connected to an input of gate 202, while the output of gate 202 is connected to an input of storage $S_2$ and to another input of gate 201. Therefore, when gates 203 and 196 conduct, the contents of $S_2$ are read through gates 202 and 201 to recording control 22. At the same time, data from $S_2$ appearing at the output of gate 202 is returned to $S_2$, so that this storage does not empty.

Also, an output J from recording processor 184 is connected by a line 204 to other inputs of gates 196 and 202 and to inverter inputs 207, 209 of gates 198 and 200. The J output is obtained in a manner explained below within the processor 184 from its AF input and indicates whether or not the just completed frame was odd or even. This J input is used to enable gates 198, 200 following an odd frame, or gates 196, 202 following an even frame, to permit the transfer of data from $S_1$ or $S_2$ in the above manner to recording control 22 whenever $S_3$ fills. An example follows to illustrate the selection by processor 184 of data from either $S_1$, $S_2$ or $S_3$ at the time of each frame.

Assume that AF is positive so that storage $S_2$ is receiving updated data words from comparator unit 12. The J signal is set to its positive level by processor 184 and such positive signal turns on gates 196, 202 and because of inversion turns off gates 198, 200. However, a read signal is not fed to gate 180 at this time, so a signal is not transmitted on line 182 to memory $S_3$ and no data is being fed from its output on line 186 to the record control 22.

At the end of the even frame, $S_2$ ceases receiving data words from comparator unit 12 while $S_1$ begins to receive data words from the comparator unit. At the same time, a read output is transmitted to gate 180, assuming $S_3$ has not filled during the frame, causing transmission of the BC2 signal through line 182 to storage $S_3$. This read signal continues until the data stored in $S_3$ during the just completed frame has been read to recording control 22. On the other hand, assuming $S_3$ has filled during this frame, then a read output is transmitted to gate 203 causing the transmission of the BC2 signal through gates 196 and 146 to storage $S_2$. This causes data to be read from storage $S_2$ through gates 202 and 201 to the recording control 22. To prevent storage $S_2$ from becoming empty, the data from gate 202 is also returned to the input of storage $S_2$ for storage therein. After the entire contents of $S_2$ have been read to record control 22, the read input to gate 203 ends and $S_2$ stops producing an output of data words.

Thereafter, processor 184 causes J to switch states turning off gates 196 and 200 and turning on gates 198 and 200. At the end of the odd frame, AF switches so that $S_1$ ceases receiving data words from comparator unit 12 and $S_2$ begins to receive data words from the comparator unit. At the same time, if $S_3$ has not filled, a read output is transmitted to gate 180 causing data to be read from storage $S_3$ to the record control until the data stored in $S_3$ during the just completed frame has been read out of $S_3$ and the read signal to gate 180 ends. In contrast, if $S_3$ has filled during this odd frame, then a read output is transmitted to gate 203, causing the BC2 signal to be transmitted through gates 198 and 152 to storage $S_1$. This causes data to be read from storage $S_1$ through gates 200, 201 to the recording control 22. The output from gate 200 is also transmitted back to the input of storage $S_1$ so that storage $S_1$ does not empty. The read signal to gate 203 ends after the contents of $S_1$ have been read to record control 22. The J signal remains in its zero state until the end of the next frame whereupon it switches and the above process is repeated.

The storages $S_1$, $S_2$ therefore operate alternately. That is, one storage is reading data to recording control 22 while the other is receiving data from the comparator unit and vice versa. Furthermore, the read signals to gates 180, 203 from recording control 22 occur periodically at the end of TV frames and the signal to gate 180 varies in duration depending upon the amount of data stored in $S_3$ during the frame. Therefore, an intermittent output of data is fed to the recording control unit 22 for recording on the data record.

A synchronization circuit means, such as shown in FIG. 5, is used for producing the second or recording bit clock signal BC2 and word clock signal WC2 and for synchronizing the BC2 signal to the BC1 signal. These signals are synchronized to adjust the average rate that data is fed from each storage $S_1$, $S_2$ to the recording control 22 to equal the average rate that stored data words from the other storage, $S_2$ or $S_1$, respectively, is compared with data words received by the comparator unit 12. For this reason, each storage will be ready to receive data words from comparator unit 12 as soon as the other storge finishes receiving data from the comparator unit. Furthermore, each storage will be ready to transmit its contents to recording control 22 as soon as the other storage completes the transmission of its contents to the recording control.

The BC1 rate is set by the rate of incoming data to digitization unit 10. A phase lock loop (PLL) 280 in FIG. 5 receives the BC1 signal and has an output connected to a clock 282. The clock output is fed back to another input of PLL 280 wherein the clock rate is compared to the BC1 rate. If the rates differ, than an adjusting voltage output is transmitted from the PLL to clock 282 to adjust the clock frequency until the rates are brought back together. The clock 282 output is also fed to a divider circuit 284 which divides the clock signal to produce the WC2 and BC2 outputs. Because the clock is synchronized to the BC1 signal, the BC2 signal will have the same average rate as the BC1 signal.

In addition, the clock 282 output is fed to a second phase lock loop 286. PLL 286 receives a scan position encoder signal SP indicating the rate that the data record 26 is being scanned and hence the rate data is recorded. This signal is produced by the recording unit 22 as described below. The clock rate is compared to the SP scanning rate by PLL 286. If the rates differ, the PLL produces a scanner speed servo control output 287 which is fed to the recording unit in the recording apparatus 24 for adjusting its scanning rate into synchronization with the clock 282 rate. Thus, scanning of the record is controlled so that, when data is recorded, it will be evenly spaced as desired on the data record.

Returning to FIg. 4, recording control unit 22 includes an AND gate 208 having an input connected to the output of gate 201 and another input connected to receive a signal D from recording processor 184. The signal D is also fed to an inverter 211 input of an AND gate 210 which receives the output from changed data memory $S_3$ at its other input. An OR gate 212 couples the outputs of gates 208, 210 to an input of a shift register 214.

The D signal is derived by processor 184 from the C signal output of flip-flop 192. If $S_3$ fills during a particular frame, then at the end of this frame D becomes positive to enable gate 208 while disabling gate 210. This allows the data from either $S_1$ or $S_2$, appearing at the output of gate 201, to pass to shift register 214 for subsequent recording. On the other hand, if $S_3$ does not fill during a particular frame, D goes to its zero state at the end of the frame. This in turn enables gate 210, disables gate 208, and allows transmission of data being read from $S_3$ into shift register 214.

A code detector circuit 220 coupled to shift register 214 detects the FS, EOL and EOF code words in the storage signals received by the shift register. A WC2 signal input to detector 220 clocks FS, EOL and EOF code words from the detector to recording processor 184 on lines 222, 224 and 226, respectively when those words are detected in shift register 214.

Although processor 184 of FIG. 4 may be hard wired, in the preferred form it comprises a programmed micro-processor. Programming of record processor 184 is illustrated by the flow chart of FIG. 8 and will be described below in connection with the operation of the recording system. Processor 184 receives recording position indicating signals F, =, and G on lines 230, 232 and 234, respectively, from the recording apparatus 24. From these recording position indicating signals the recording processor 184 determines, as explained below, whether or not the recording apparatus is ready to record data at a desired place of the record.

Recording processor 184 also produces an output on a line 236 to shift register 214 for causing the shift register to transmit data it receives along a line 238 to an input of an OR gate 240 in the recording apparatus. In addition, processor 184 generates a number of write code outputs each of which is fed to an input of a read only memory 244. ROM 244 contains the following code words, the frame start (FS), the start of data (SOD), digital line start (LS), partial frame (PF), odd-even (OE), end of all information connected with a particular frame (EOR), audio start (A), end of segment of data (EOS), sync. signal (sync) digital line end (DLE) and end of audio (EOA). Each input of ROM 244 is associated with one of these code words so that when a write signal is fed from the processor to each of said inputs, ROM 244 produces an output of the associated code word to OR gate 240 on a line 246. These code words are inserted by processor 184 at selected positions in the data stream at the output of gate 240 which is being recorded on the data record for use on playback of the data record to reconstruct the recorded television signal. The purpose and sequencing of these code words will become apparent in connection with the discussion below of FIG. 8.

Recording processor 184 receives and uses the BC2 and WC2 signals in processing information. Also, processor 184 produces a reset clock output to the clock 282 of FIG. 5 for purposes of synchronizing the clock.

Word identification circuit 20 is shown in FIG. 4 to include a frame counter 250 for producing frame number position identifying words identifying the frame from which data words originate. Frame counter 250 is incremented in response to each FS signal it receives at one of its inputs from output 72 of digitization unit 10. Frame number words are read from counter 250 on a line 252 to an input of OR gate 240 in response to read signals from and output of an AND gate 248. Gate 248 receives at one input the BC2 signal and at its other input a write FN signal from processor 184. Thus, at times determined by processor 194, a frame number cord word is fed from counter 250 to the recording apparatus 24 for recording on the data record.

AUDIO MEMORY UNIT

The audio memory unit 28 is shown in FIG. 4 and includes an audio memory 254, hereafter called $S_4$, which receives the audio data words from line 92 of digitization unit 10. Data from memory 254 is read out on a line 258 to gate 240 in response to an output of an AND gate 256 which is fed to $S_4$. One input of gate 256 receives the BC2 signal. Recording processor 184 transmits an output signal K to another of the inputs of gate 256 whenever the processor determines that the analog input signal is in a vertical blanking interval at the end of a field. Also, processor 184 feeds a write audio signal (Write A) to gate 256 to turn on gate 256 and allow the transmission of audio data to the recording apparatus during vertical blanking intervals. Of course, the write A signal and K signal could easily be designed to occur at other preselected times during the analog television signal if desired, for example, during horizontal blanking intervals of the signal.

Audio memory 254 also produces a not zero output which triggers a flip-flop 260 to produce a positive output signal AC at output 262 whenever an audio data word is stored in the memory during a frame. The AC signal is fed to processor 184 to indicate the presence of audio information for recording. Flip-flop 260, and hence the AC output, is reset at the start of each frame by an FS input signal from line 72 of digitization unit 10.

RECORDING APPARATUS

Although the recording apparatus 24 may comprise means for recording data on a magnetic tape or other medium, it preferably comprises means for recording data on a digital optical record 26. The intermittent output of data received at gate 240 is fed to a light modulator driver 268, which may include a high speed shutter operated in response to the received digital data to produce a beam 269 of light pulses representing the data. The light pulses are then fed to a recording unit 270 for use in recording digital optical record 26. The modulator driver and recording unit may be of the type described in U.S. Pat. No. 3,624,284 of Russell and therefore will not be described in detail.

Recording unit 270 has an electrical output coupled to an input of a scan position encoder 271 for transmission of an analog signal to the encoder according to the position of the data record on which data is being recorded. This position reference signal contains address information indicating the digital line of the record and position along the line where recording is occurring. From this signal, encoder 271 produces an output SP of digital position indicating words on a line 272 that each indicate the data record position at which recording unit 270 is ready to record. Line 272 is connected to a hold last location memory 274 and also to a digital comparator 276. Memory 274 has another input which is coupled to recording unit 270 for receiving a control pulse from the recording unit each time the recording unit no longer receives data from gate 240 and hence ceases to record data. This control pulse occurs, for example, following the recording of data from memory $S_3$ and prior to the end of the next frame when additional data would be recorded. In response to the control pulse from the recording unit, hold last location memory 274 stores the position indicating word it received on line 272 at the time the recording unit stopped recording.

Hold last location memory 274 has an output connected to comparator 276. Comparator 276 compares the position stored in memory 274 with the position indicated on line 272. When the positions are equal, comparator 276 transmits an equal signal (=) on line 232 to the recording processor 184. After receiving this signal, the processor 184 causes the transmission of data from its output 238 to OR gate 240 for recording. Of course, if there is no data to be recorded at the time the comparator 276 determines the line position at 272 is equal to the position stored in memory 274, then nothing is fed to gate 240 until the next time the positions are equal and there is data to be recorded. For this reason, new data is recorded on the data record without overlapping previously recorded data and without undesirable storage wasting gaps between the new data and previously recorded data.

The recording apparatus also includes a read only memory 278 having an output connected to comparator 276. In response to a WC2 input signal, ROM 278 transmits additional position indicating words to comparator 276. These words from ROM 278 correspond to places on the data record where it is desired to insert gaps in the recorded data. Comparator 276 compares the position words from line 272 with the position words from ROM 278. If they are equal, then a gap signal F is read from comparator 276 on line 230 to the recording processor. As a result, processor 184 prevents the transmission of data to OR gate 240 until such time as the gap signal ends, at which time data is again transmitted to the gate. In this manner, a gap is placed in the data at appropriate places on the data record which may be used, for example, to facilitate copying of the data record as explained in co-pending U.S. patent application Ser. No. 679,005 of James T. Russell. Similar gap signals G are also fed to recording processor 184 from the comparator 276 on a line 234 to cause the placement of gaps at the end of each digital line of the data record.

Line 272 is also connected to PLL 286 of the synchronization circuit of FIG. 5 so that the rate of the scan position encoder signal SP may be compared to the clock 282 rate. As mentioned above, PLL 286 produces an output 287 to the scanning servo of the recording unit 270 to synchronize the scanning rate to the clock 282 rate.

OPERATION OF RECORDING SYSTEM

The operation of the recording apparatus will be described with reference to the flow charts of FIGS. 7 and 8. The following table contains a glossary of terms and symbols used in these flow charts.

TABLE II

| Symbol | Definition for Symbol |
|--------|----------------------|
| A | Audio start code |
| AC | Code indicating audio change present during frame |
| B | Blanking flag, indicates either horizontal or vertical blanking |

TABLE II-continued

| Symbol | Definition for Symbol |
|---|---|
|  | interval. |
| C | Signal indicating $S_3$ is full |
| D | Flag set in response to C signal |
| DLE | Digital line end code |
| E | Flag indicating scanner is in a gap (either a copying gap or end of digital line gap). |
| E2 | Flag set by frame start (FS) code word |
| EOA | Code indicating end of one field of audio data words |
| EOC | Code indicating end of sequence of successive data words on one TV line |
| EOF | End of field code |
| EOR | Code indicating end of all information (video and audio) from a frame |
| EOS | Code for end of segment of data prior to gap in data or record |
| F | Flag indicating scanner is within a copying gap |
| FN | Coded frame number |
| G | Flag indicating scanner is in gap at end of a digital line |
| Gap | Space in data on record |
| HB | Horizontal blanking interval |
| J | Flag and signal set in response to AF signal |
| K | Flag and signal set for audio recording |
| LN | Coded line number |
| LS | Start of digital line code |
| OE | Odd-even frame code |
| PF | Partial frame code |
| S | Synchronization code |
| SOD | Start of video data code |
| VB | Vertical blanking interval |
| VC | Code indicating video change occurred in a frame |
| WN | Coded word number |
| Z | Flag indicating first field of frame |
| Z2 | Flag for triggering full frame and frame number following frame containing no video change |

LOADING OF UPDATED DATA WORDS INTO $S_3$ AND UPDATING $S_1$ AND $S_2$.

Figure 7:
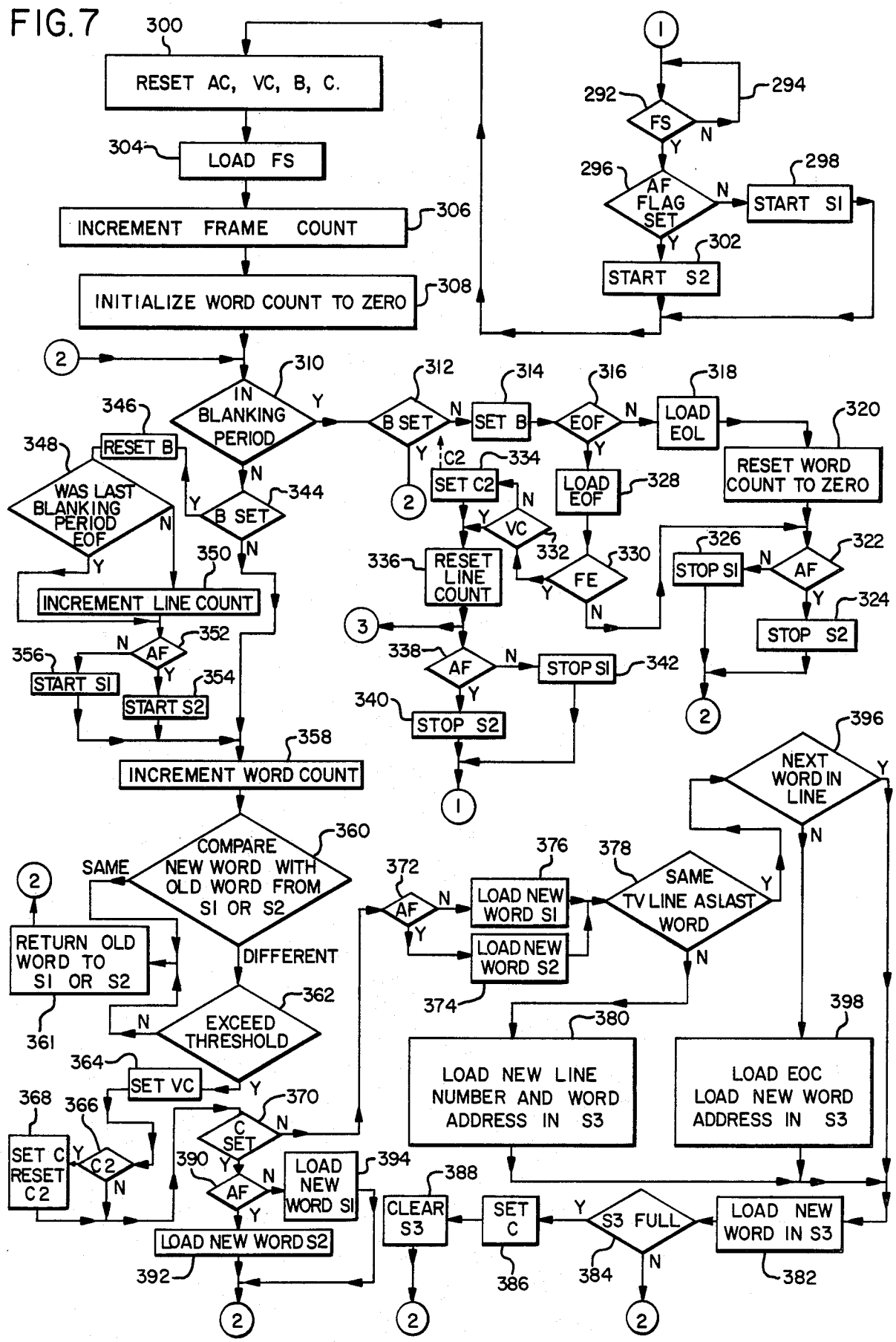
FIG. 7 is a flow chart of the operation of the system in loading information into recirculating storages $S_1$, $S_2$ and changed data memory $S_3$.

Starting at position ① of FIG. 7, decision block 292 determines whether line 72 of digitization unit 10 is producing an FS output. If not, the block 292 no branch, N, is followed back to the input of block 292 and the question is repeated. Eventually an FS signal occurs and the block 292 yes branch, Y, is followed to a decision block 296 which determines if the AF flag is set, that is, if the AF signal from line 80 of digitization unit 10 is positive. If not, a procedure block 298 is reached, storage $S_1$ starts, and a reset block 300 is reached. On the other hand, if AF is positive, the block 296 yes branch is followed to a block 302, storage $S_2$ starts and reset block 300 is reached. Thus, depending upon the AF setting, either $S_1$ or $S_2$ (the one that starts) will be comparing data with data received by comparator unit 12. For purposes of the following discussion, it is assumed that AF is positive so that $S_2$ starts.

At block 300, AC and VC are reset to indicate that no audio or video changes have yet been received for the frame. Also, block 300 rests blanking flag B to zero as no blanking interval has been indicated. Furthermore, the C signal from flip-flop 192 is reset to zero at block 300 so that it does not indicate $S_3$ is full.

As indicated by block 304, the FS code word is then loaded from ROM 122 into storage $S_3$ and also into storage $S_1$ or $S_2$, in this case $S_2$ since it is the storage that has started. Frame counter 250 is then incremented (i.e. from zero to one to indicate the first frame of the television signal) at block 306. Next, at block 308, word counter 172 is reset or initialized to zero as at the time of an FS signal no video data words, and hence no TV lines, from the next television frame will be present.

From block 308 a decision block 310 follows and asks if the television signal is in either a horizontal or vertical blanking interval. Assuming the answer is yes, the block 310 yes branch, Y, carries the routine to a decision block 312 which asks if the B flag has been set. At this point, the answer is no because B was reset at block 300. Therefore, a block 314 is reached and the B flag is set to indicate the blanking interval. A decision block 316 follows to determine the nature of the blanking interval by asking if the blanking interval is at the end of a field. If the answer is no, then the blanking interval is an end of line interval. Block 318 is then reached and the EOL code word is loaded into $S_2$ (the operating storage) and $S_3$.

Block 320 follows block 318 and indicates that word counter 172 is reset to zero in preparation for the start of data words in the next TV line. At a decision block 322 AF is then checked to see if it is set. Since in the present example AF is set, the block 322 yes branch carries the routine to a block 324 and storage $S_2$ stops operating. This is accomplished by flip-flop 144 upon its receipt of an end of code word signal from ROM 122. Had AF not been set, then the block 322 no branch would be followed to block 326 and $S_1$ would stop operating. Blocks 324 and 326 lead to position 2 at the input of decision block 310. The time occupied by the EOL code word is shorter than the horizontal blanking interval so that block 310 would again determine the signal is in a blanking interval and its yes branch would be followed to block 312. Unlike the first time through this loop, B is now set so that the block 312 yes branch is followed back to position 2. This loop from block 310, to block 312, to position 2 and back to block 310 is followed until the end of the horizontal blanking interval at which time the block 310 no branch is followed.

Returning to decision block 316, and assuming the blanking interval determined at block 310 is at the end of a field, the block 316 yes branch is followed to a procedure block 328 and the EOF code word indicating the end of a field, is loaded from ROM 122 into $S_3$ and into the operating storage $S_2$. From block 328, decision block 330 then asks if the television signal is at the end of the frame (FE), that is, if the EOF code is the second EOF code since the last FS signal and corresponds to the end of the second field of the frame. If it is not the second field of a frame, the block 330 no branch goes to block 322 and to block 324 wherein storage $S_2$ is stopped and position 2 is reached. The EOF code word is shorter than the vertical blanking interval so that the routine will repeat the loop from block 310, to block 312 to position 2 (because B is now set) to block 310 until after the vertical blanking interval ends and the no branch of block 310 is followed.

However, at block 330 if it is found that the TV signal is at the frame end (i.e. from line 74 of digitization unit 10), then a determination is made by block 332 whether or not there is a change in video information, VC, from the previous frame, that is, if flip-flop 168 has been set to produce a VC output on line 170. If there has been no video change, as shown by dashed line in FIG. 7, block 334 sets an optional internal flag $C_2$ within processor 184 for purposes explained below. Block 334 goes to a block 336 wherein the line count is reset because the next line of data received by comparator unit 12 will be from the first line of the next frame. On the other hand, if there has been a video change during a frame, the block 332 yes branch bypasses block 334 and goes directly into block 336. From block 336 the routine branches with one portion going to position 3, also present in FIG. 8, triggering the recording of data onto the data record as determined by recording process 184. The other branch from block 336 leads to a decision block 338 which ask if AF is set. In the example under discussion, AF is set so that block 340 is reached and storage $S_2$ is stopped. Had AF not been set, then the no branch of block 338 would have been followed to a block 342, wherein $S_1$ would be stopped. From blocks 340, 342 the routine returns to position 1 where it remains until the occurrence of the next FS signal. Thereupon the routine continues although the AF signal would now be zero. Of course, by switching the AF signal at the end of each field instead of each frame and digitizing all the lines of each frame, data words from first fields of frames will be stored in one of the recirculating storages $S_1$ and $S_2$ and all of the data words from second fields in the other storage.

Returning to block 310, when the TV signal is not in a blanking interval the block 310 no branch carries the procedure to a decision block 344. At block 344 it is determined if the B flag is set. At this point in the routine B would only be set if either a horizontal blanking interval has just ended or the vertical blanking interval at the end of the first field of a frame has ended. Assuming B is set, a block 346 is reached and B is reset to its zero or unset state. From block 346 a decision block 348 follows and asks if the last blanking period was at the end of a field. If the answer is yes, this means that block 310 just finished detecting the first field of a frame. If the answer is no, then block 310 just detected an end of a television line horizontal blanking interval and the block 348 no branch is taken to a block 350 at which point the line counter 174 is incremented to match the line of the frame from which data will be received. Both the yes branch from block 348 and the output of block 350 go to a decision block 352 which asks whether or not AF is set.

In the present example, AF is set so that the block 352 yes branch is followed to block 354 and storage $S_2$ is started. Had AF not been set, a block 356 would have been reached resulting in starting of $S_1$. Blocks 354 and 356 go to procedure block 358. It should be noted that if the data received by comparator unit 12 follows the FS signal, or it is not the first data word following either an EOL code word or the first EOF code word of a frame, then B will not be set and the routine will follow the no branch of block 344 directly to procedure block 358. Block 358 indicates word counter 172 incrementing the word count by one from its prior value. Thus, if the data word is the first data word of a TV line, the word count is raised to one from its initialized value of zero set in blocks 308, 320.

A comparison block 360 follows block 358 and shows that the new word received by the comparator unit 12 is compared with the corresponding data word from $S_2$ (from $S_1$ if AF had not been set). Corresponding data words are those that are at the same line subinterval position from the start of a frame. If the compared corresponding words are the same, then the block 360 "same" branch goes through block 361 and returns the routine to position 2 and thus to block 310. If not in a blanking interval, the routine turns through blocks 344, 358 to block 360 and the next data word received by comparator 100 is compared at block 360 with its corresponding stored word from storage $S_2$. Although it may not occur until a following line, or frame, eventually two compared words will differ. The "different" branch of block 360 is then taken to block 362 and threshold detector 104 checks whether or not the compared words differ by an amount exceeding the threshold it has established. If the threshold is not exceeded, then the routine goes through block 361 to position 2 and the steps leading to the comparison of the next pair of corresponding data words are repeated.

Assuming the threshold is exceeded, block 364 is reached from block 362 and the VC signal (from flip-flop 168) is set to indicate that a frame contains a video change.

Following the setting of VC in block 364, an optional decision block 366 follows. Block 366 operates in conjunction with the operational set C2 block 334 and asks if C2 has been set. As mentioned above, C2 is set following a frame during which no change in video data is present. If the answer at block 366 is yes, recording processor 184 causes the setting of flip-flop 192 to produce the C output signal as indicated by block 368, even though $S_3$ amy not be full. Processor 184 also resets the C2 flag to its zero or unset state. With this optional feature, at the end of a frame following a frame having no video changes, the contents of either $S_1$ or $S_2$ will be read out for recording and not data from $S_3$. Although unnecessary, C2 is included to update the entire frame following frames for which no video data words are recorded. This reduces the effect of any errors that may appear on playback during frames for which no video data changes have been recorded on the data record. Assuming, for example, that an odd frame has no video changes, then C2 will be set during the first frame following this odd frame that has a video data change. Further, assume that this next frame with a video data change happens to be the even frame immediately after this odd frame. In this case, recording processor 184 sets the C flag so that the entire even frame, which follows, will be read from $S_2$ to recording control 22. The lines from this even frame are adjacent to the lines of the previous odd frame. As a result, any errors occurring during the prior odd frame would tend to be overlooked by the person viewing the signal on playback, as such errors would blend in with the correct information in adjacent lines from the following even frame.

Both the no branch of block 366 and block 368 lead to a decision block 370 which asks if C has been set. Usually C will not be set as frame-to-frame changes are not normally enough to fill $S_3$. Therefore, the block 370 no branch is followed to a decision block 372 which checks whether or not AF is set. In this case AF is set so a block 374 is reached and the new data word is loaded as an updated data word into $S_2$ in the position in the data stream formerly occupied by the previously stored word compared with such new word. Had AF not been set, block 376 would have been reached from block 372 and the updated data word would have been loaded into $S_1$. In this manner, comparator unit 12 replaces the stored data words in their storages with corresponding updated words whenever the compared stored (old) data word and compared received (new) data word differ by at least the threshold amount.

Blocks 374, 376 go to a decision block 378 which checks whether or not the updated data word is in the same television line as the previous updated data word received by block 378. If not (i.e. the data word is the first word of another line), then the block 378 no branch is followed to a procedure block 380. At block 380, the line number and word address of the updated data word is loaded by the word identification unit into storage $S_3$. Following the loading of this address information, a block 382 is reached and the updated data word is loaded into storage $S_3$.

Block 382 goes to a decision block 384 at which time storage $S_3$ is checked to see if it is full. Assuming the just loaded information has filled $S_3$ then block 386 is reached and C is set by flip-flop 192. Thereupon, $S_3$ is cleared at block 388 and position 2 is reached so that the comparison process is repeated with the next data word. However, when block 370 is again reached, C is now set so the yes branch from block 370 is followed to a decision block 390 at which time it is determined if AF is set. In the present example, AF is set so block 392 follows and the new word is loaded into $S_2$. If AF were not set, then block 394 would follow block 390 and the new word would be loaded into $S_1$. Replacement of stored words with updated data words in the operating storage $S_2$ continues until the next frame start when AF switches and the process is repeated with $S_1$.

Returning to block 378, if the next updated data word is from the same television line as the previous updated data word, the routine goes to a decision block 396 which checks whether or not the next updated data word is in the next line subinterval position following the line subinterval position of the previous updated data word. If so, block 382 is reached and the data word is loaded following the previous updated data word without any intervening address information. On the other hand, if the next updated data word is not from the next line subinterval position, then block 398 is reached from block 396 and an EOC code word is loaded following the previous data word to indicate this last data word is the last data word of a sequence of one or more data words. In addition, the word address for this next updated word is loaded into storage $S_3$. Thereafter block 382 is reached and the next updated data word is then loaded into $S_3$.

In this manner, data words and code words generated from the television signal are loaded in proper sequence into storages $S_1$, $S_2$ and $S_3$ with great efficiency.

RECORDING OF DATA RECORD AND PROGRAMMING OF THE RECORDING PROCESSOR — FIG. 8

Figure 8:
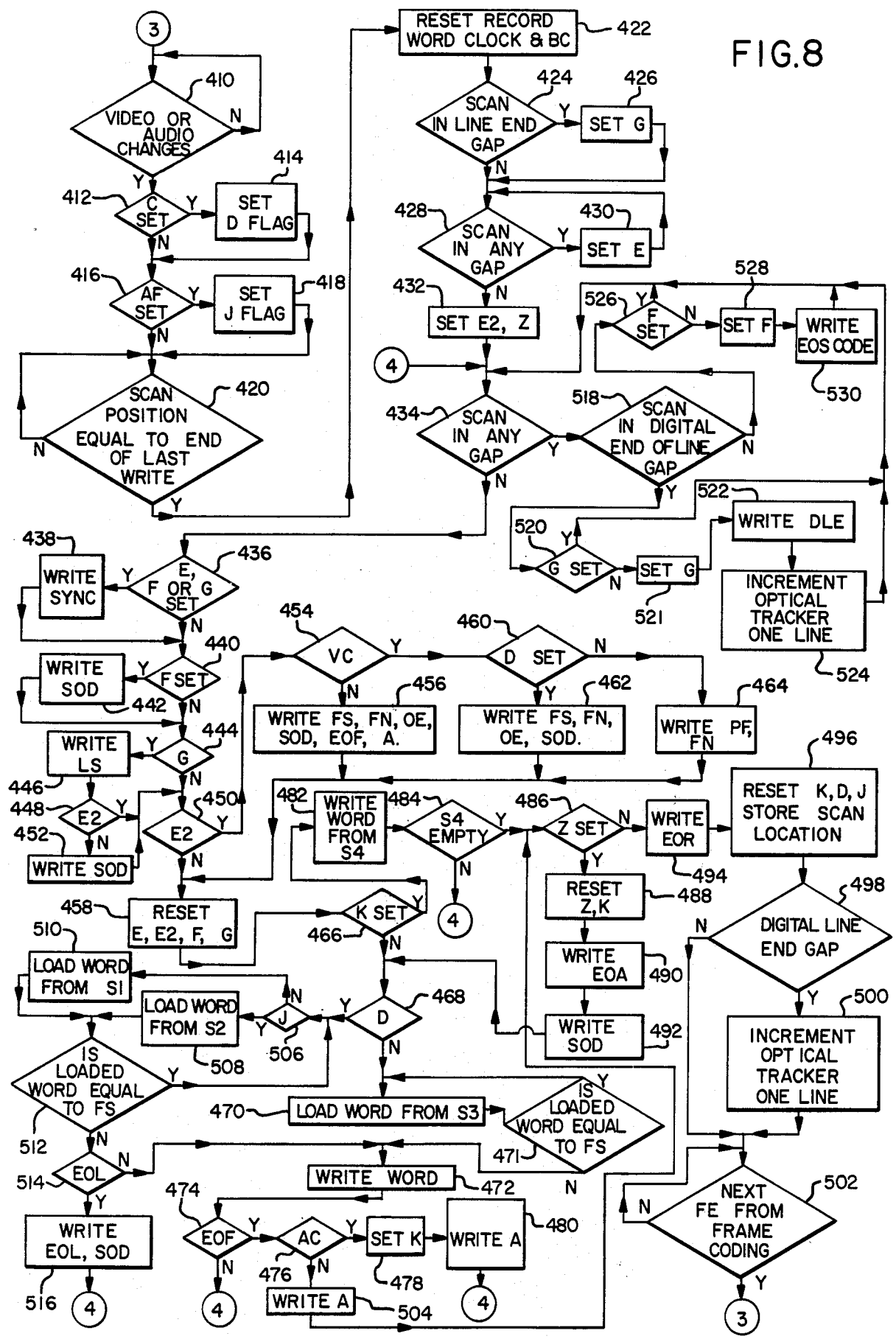
FIG. 8 is a flow chart of the programming of a recording processor in the intermittent recording control and of the operation of the recording system to record a data record.

As explained in connection with FIG. 7, position 3 of FIG. 8 is reached immediately following the end of each frame of the television signal. A decision block 410 follows position 3 and the frame is checked to determine if it contained any audio or video changes. This is determined by processor 184 from its VC and AC inputs.

If no video or audio changes are present in the frame, the routine loops from the block 410 no branch to position 3 and back through block 410 again and again until either a video or audio change is found in a frame. Therefore, there will be no information recorded on the data record during at least certain of the frames for which there are no changed data words.

Assuming there are such video or audio changes, the routine follows the block 410 yes branch to a decision block 412 which asks if the C signal ($S_3$ full indication) is set. This is determined by recording processor 184 from its C input. If yes, block 414 follows, and an internal D flag within processor 184 is set. The D output from processor 184 is positive or zero depending on whether or not the D falg is set and enables data to be read from $S_1$ or $S_2$, or $S_3$ as previously described. The D flag retains the value set at block 414 until data from the just completed frame is recorded. This is true even though before data from said just completed frame has been recorded, the C signal may change to a new level due to loading of data from the next frame by digitization unit 10 into $S_3$.

Block 414 and the no branch of block 412 go to a decision block 416 which checks if AF is set (positive) or unset (zero). Processor 184 makes this determination from its AF input. If AF is positive, that is, the frame was an even frame, the block 416 yes branch is followed to a block 418 which indicates the setting of a J flag by processor 184. The J flag preserves the AF value until such time as recording of data from the frame is completed and is used to produce the j output signal from processor 184 for use during recording of data as previously described.

The block 416 no branch and block 418 lead to a decision block 420 which asks if the scanner in the recording unit 270 is in postion to record data at the position of the data record following the position where the most recent data was recorded. Processor 184 determines this from the equal (=) input it receives on line 232 from the recording apparatus 24. The routine loops from the block 420 no branch thrugh block 420 again and again until the scanner position is equal to the end of the last write position. Thereupon the block 420 yes branch is followed to a block 422 which indicates the resetting of the record word and bit blocks. This is accomplished for synchronization purposes by the reset clock output produced by processor 184.

A decision block 424 follows block 422 and asks if the scanner is in a gap at the end of a digital line of the record. Processor 184 makes this determination from its G input on line 234 from the recording apparatus. If the scanner is in such a gap, block 426 is reached and a G flag is set within processor 184. Block 426 and the no branch of block 424 go to a decision block 428 which asks whether the scanner is in the position where any gap is desired. By any gap, it is meant both the gaps at the end of digital lines of the record and the gaps inserted on the record for purposes of copying. processor 184 determines the answer to this question from the F and G inputs it receives from the recording apparatus.

Assuming the scanner is in a gap, a procedure block 430 is reached and processor 184 sets an E flag indicating this fact. Block 430 is connected to block 428 to form a loop through these two blocks that is followed until the scanner is no longer in a gap position. At such time the no branch from block 428 is followed to a procedure block 432 and the processor 184 sets $E_2$ and Z flags representing the frame start and first field of a frame, respectively.

The question is then asked at a block 434 if the scanner is in any gap. Since at block 428 this question was answered negatively, the block 434 no branch is taken to a decision block 436. Block 436 asks if the E, F or G flags are set, that is, whether a gap or space in data on the data record has just occurred. If yes, a block 438 is reached and processor 184 causes a sync signal to be written on the data record following the gap. A sync signal is therefore inserted after all gaps in data on the data record for synchronizing the playback of the record.

Block 438 and the no branch from block 436 go to a 1data block 440 which indictes a determination by processor 184 of whether or not F is set. if F is set, it means that a copying gap is on the record just prior to the sync signal written at block 438. In this case, block 442 is reached and processor 184 causes the start of dta code word (SOD) to be fed to the recording apparatus for recording. Thus, following each copying gap there will be a sync code word S followed by an SOD code word.

Block 442 and the block 440 no branch, lead to a block 444 at which the G flag is checked by processor 184 to see if it is set. That is, whether the scanner was just in a digital line end (DLE) gap. If yes, a block 446 is reached and the recording processor causes the writing of the digital line start code word (LS) on the record. Therefore, following each digital line there will be a sync code and an LS code on the data record. Furthermore, these codes will be written on the next digital line of the record for reasons explained below.

Block 446 goes to a block 448 which asks if $E_2$ is set. In this case $E_2$ was set at block 432 so the yes branch of block 448 is followed to a block 450. On the other hand, if $E_2$ is not set than data received by the processor 184, if any, will be from the second field of a frame and block 452 is reached. At block 452, processor 184 causes the SOD code word to be written on the record following the LS code word. Block 452 also goes to block 450.

Block 450 again asks if $E_2$ is set. $E_2$ in this example was set in block 432 and has not been reset so that the block 450 yes branch is followed to a decision block 454. Block 454 asks if there has been a video change in the frame. This is determined by processor 184 from its VC input. if the answer is no, this means that only audio changes have occurred. Thereupon, as indicted by a block 456, processor 184 causes the FS, FN, OE (odd-even code word derived from AF depending on whether the frame in question is odd or even), SOD, EOF and A (audio start) code words to be written on the record in that order. From block 456 the routine goes to a block 458 indicating the resetting of flags E, $E_2$, F and G to their initial unset states by processor 184. If an updated video data word is present during the frame, then block 454 yes branch is followed to decision block 460 which asks if the D flag is set. If D is set, then $S_3$ has filled during the frame and data will then be recorded from either storage $S_1$ or storage $S_2$. Assuming D is set, then block 462 is reached indicating the writing of the FS, FN, OE and SOD code words in that order on the data record. Block 462, like block 456, also leads to block 458. If D is not set, and hence $S_3$ did not fill during a frame, the block 460 no branch is followed to a block 464 which in turn leads to block 458. When block 464 is reached, processor 184 causes the partial frame code word PF and coded frame number FN to be written on the data record. The PF code means that only the changed or updated data words from $S_3$ will be recorded for the frame.

From block 458 the routine goes to a decision block 466 which asks if the processor has set an audio recording flag K. The K flag is not set until the end of a field of video data has been reached and then only if an audio change has occurred during the frame. As of yet, the K flag has not been set so the routine goes to a decision block 468 which asks if the D flag is set. Assuming that the D flag is not set, a block 470 follows and processor 184 reads a word from storage $S_3$ into its shift register 214, in FIG. 4. If the loaded word is not equal to the FS code word, as determined by the processor and indicated in decision block 471, then processor 184 causes the word to be transmitted to the recording apparatus for writing on the data record as indicated by the following write word procedure block 472. However, if the word loaded from $S_3$ is equal to FS, then block 471 sends the routine to the input of block 470 for loading of the next data word from $S_3$. In this manner, the FS code word contained in $S_3$ is deleted from the data record, as it is not used when this record is played back.

A decision block 474 follows block 472 and asks if the written word, as detected by code detector 220 of the recording processor, was an EOF word. If not, the block 474 no branch is followed to position 4 at the input of block 434. The routine then continues through the loops as explained above to record the next data word from changed data memory $S_3$. Eventually, block 474 will determine that the written word was an EOF word. In this case, decision block 476 is reached which asks if there has been a change in at least one audio data word during the field. Processor 184 makes this decision in accordance with its AC input. If there is an audio change during the field, processor 184 sets a K flag as shown by block 478 and then causes the audio start code word A to be written on the record as shown by block 480. The routine then goes to position 4 at the input to block 434 and continues through the loops.

However, when block 466 is again reached, its yes branch is followed to a procedure block 482 as K is now set. At block 482, recording processor 184 sends a write audio data word to audio memory unit $S_4$ to cause transmission of an audio data word to the recording apparatus for writing on the record. The processor then determines if $S_4$ is empty as shown by block 484. If not, the routine goes back to position 4 and through the loops to pick up the next audio data word. After $S_4$ empties, the processor then determines if the Z flag is set as shown by block 486. Since Z was initially set back at block 432 and has not been reset, the block 486 yes branch is followed to a procedure block 488 indicating the resetting of the Z and K flags by processor 184. Processor 184 then causes the end of audio code word EOA to be written at block 490, followed by the SOD code word written at block 492. From block 492, the routine returns to the input of block 468 and, since D is still not set, follows the no branch of block 468 to the loops beginning at block 470 to pick the next data $S_3$, which will be from the second field of the frame. Eventually, processor 184 will detect the second EOF code word of the frame, set K at block 478, write A at block 480 and will write any following audio data words at the time blocks 468 and 480 are reached. When block 486 is again reached, Z is not set as it was placed in its zero position at block 488 the first time through the loop. Therefore, the block 486 no branch is followed to a block 494 at which time processor 184 causes an EOR word to be written on the data record. The EOR code indictes that all data associated with a particular frame has been recorded.

As indicated by the next block 496, processor 184 then resets the K, D and J flags to their initial zero or unset states and the hold last location memory 274 (FIG. 4) of the recording apparatus stores the scan location for use during subsequent times when recording occurs. Block 496 goes to a decision block 498 which asks if a digital line end gap has been reached. If yes, then the optical tracker or scanner of recording unit 270 is incremented to the next digital line on the data record as shown by block 500. However, block 500 is bypassed by the no branch of block 498 if a digital line end gap has not been reached. Block 500 and the no branch of block 498 lead to a decision block 502 at which point the routine loops from block 502 through its no branch repeatedly until processor 184 receives the next FE signal from digitization unit 10. When this occurs the routine goes through the yes branch to position 3 and the process continues.

Returning to block 476, if there are no audio changes in a frame the AC block 476 no branch is followed and processor 184 causes the A code to be written on the record as shown by block 504. From block 504 the routine goes to block 486 and, depending on whether or not Z is set, either the EOA code word (block 490) or the EOR code word (block 494) will next be written on the data record. Audio code information is thus recorded during the vertical blanking interval at the end of such field. Of course, audio could be recorded during other selected intervals.

Assume during the next frame there are audio changes but no video changes. When the routine reaches D block 468, D would not be set. Therefore, block 470 would be reached. However, there would be no video data words in $S_3$ so nothing is loaded during block 470 or written during block 472. Block 474 would then test if the word is an EOF word. The answer would be yes as no video data has been recorded. Thereafter, K is set in block 478 and the audio information is recorded as explained above.

Next assume that a frame contains a large number of changes so that $S_3$ is filled. The D flag would be set for this frame so that when block 468 is reached, its yes branch is followed to a decision block 506 and the J signal is tested by processor 184. If J is positive, it means that the frame was an even frame stored in $S_2$ and that the comparator unit 12 just completed updating the contents of $S_2$. Therefore, processor 184 loads a word from $S_2$ as shown by block 508, into its shift register 214 (FIG. 4). In contrast, had it been an odd frame, J would not be set and block 510 would have been reached. This would result in loading of a data word from $S_1$ into shift register 214 of recording control 22. Blocks 508 and 510 lead to a decision block 512 which asks if the loaded word is the FS code word. If so, the block 512 yes branch is taken back to the input of block 506 and the FS code word is deleted from the recording control. The FS word is deleted at this point because it may have been distorted at the time it was loaded into $S_1$ to $S_2$. However, recording processor 184 has generated a new undistorted FS code word (back at block 462), so that an FS word will nevertheless appear in a proper sequence on the data record.

If the word located at block 508, or 510, is not an FS word, then the block 512 no branch is followed to another decision block 514 which asks if the loaded word is an EOL word. Assuming that the loaded word is not an EOL word, the no branch of block 514 is followed to block 472 so that the word is written on the data record as previously explained. The routine continues from block 472 until it eventually reaches position 4 and follows the loops until block 508 is again reached and the next data word is located from the storage $S_2$. Eventually, an EOL word will be loaded from $S_2$ so that the block 514 yes branch is followed to a block 516. At block 516 the recording processor causes the EOL and SOD code words to be written on the data record in that order. The routine then returns to position 4 and recycles until the complete set of data words stored in $S_2$ has been loaded to the recording control. During the next frame, the J flag will change polarity and if $S_3$ has filled, the cycle through block 510 would be followed and the contents of $S_1$ would be loaded into recording control 22.

Thus, the recording control intermittently and selectively couples either storage $S_1$ or storage $S_2$ or storage $S_3$ to recording apparatus 24 at the end of each frame depending upon the amount of data received by changed data memory means $S_3$ during a frame.

During each loop through position 4 the processor 184 tests at block 434 to see if the scanner is in a space on the data record where a gap is desired. When the answer is yes, the nature of the gap is determined at block 518. Processor 184 determines this from its F and G inputs on lines 230, 234 respectively. Assuming it is a gap at the end of a digital line, the processor 184 checks if gate G is set at block 520. G will not be set if the digital line end gap has just started. In this case, block 521 is reached, G is set, and processor 184 causes the digital line end code word DLE to be written on the data record at block 522. From block 522 the optical scanner is incremented one line at block 524 and the routine returns to the input of block 434. If the signal is still in the digital line end gap, blocks 518 and 520 are reached. However, G is now set so the yes branch of block 518 is taken back to block 434. This cycle through blocks 434, 518, 520 and back to block 434 continues until the digital line end gap ends and block 436 is reached.

Returning to block 518, if the gap is not a digital line end gap, then it must be a copying gap and the no branch of block 518 is followed to a block 526. At block 526 recording processor 184 tests whether or not the F flag is set. F will not be set at this point in cases where the copying gap has just started. In these cases, the F flag is then set at block 528. Thereafter, the processor causes an EOS code word to be written on the data record at block 530 to indicate the end of a segment of data just before a copying gap. From block 530, the routine returns to block 434. If the copying gap is still occurring then blocks 518 and 526 are reached. However, F will now be set so that the yes branch of block 526 is followed back to block 434. The loop from block 434 through blocks 518, 526 and back to block 434 continues until the copying gap ends at which time the routine moves to block 436.

In the above manner, coding of data onto the data record is accomplished. The following table provides a few examples of coding patterns, or data sequences that may appear on the data record.

TABLE III

| | Partial Frame Case (Data being recorded from $S_3$) |
|---|---|
| I. | PF/FN/LN/WN/Updated data word/.../Updated data word/EOC/WN/Updated data word/EOC/EOL/ |
| (Partial frame starting some- | LN/WN/Updated data word/EOS/Copying gap/S/SOD/ Updated data word/EOL/EOF/A/Audio data word/ DLE/digital line end gap/S/LS/SOD/Audio data |

TABLE III-continued

| | |
|---|---|
| where within a digital line of the record.) | word/EOA/SOD/LN/WN/Updated data word/EOC/EOF/ A/EOR |

Full Frame Case (Data being recorded from $S_1$ or $S_2$

| | |
|---|---|
| II. (Full frame starting coincidentally with start of digital line.) (Full frame starting somewhere within a digital line.) | S/LS/FS/FN/OE/SOD/Data word/Data word/... Data word/EOL/SOD/Data word/Data word.../ EOS/Copying gap/S/SOD/Data word/.../Data word/DLE/End of digital line gap/S/LS/SOD/ Data word/.../Data word/EOL/.../EOF/A/Audio data word/Audio data word/...Audio data word/ EOA/SOD/Data word/Data word/.../EOL/EOS/ Copying gap/S/SOD/Data word.../Data word/EOF/ A/Audio data word/.../Audio data word/EOR/ .../EOR/FS/FN/OE/SOD/Data word/... |
| III. (Partial frame no video changes, only audio.) | .../FS/FN/OE/SOD/EOF/A/Audio data word/.../ EOA/EOF/A/Audio data word/.../Audio data word/ EOR |

In the above table the "/" marks do not indicate a blank space between data words on the data record.

PLAYBACK APPARATUS

Figure 6:
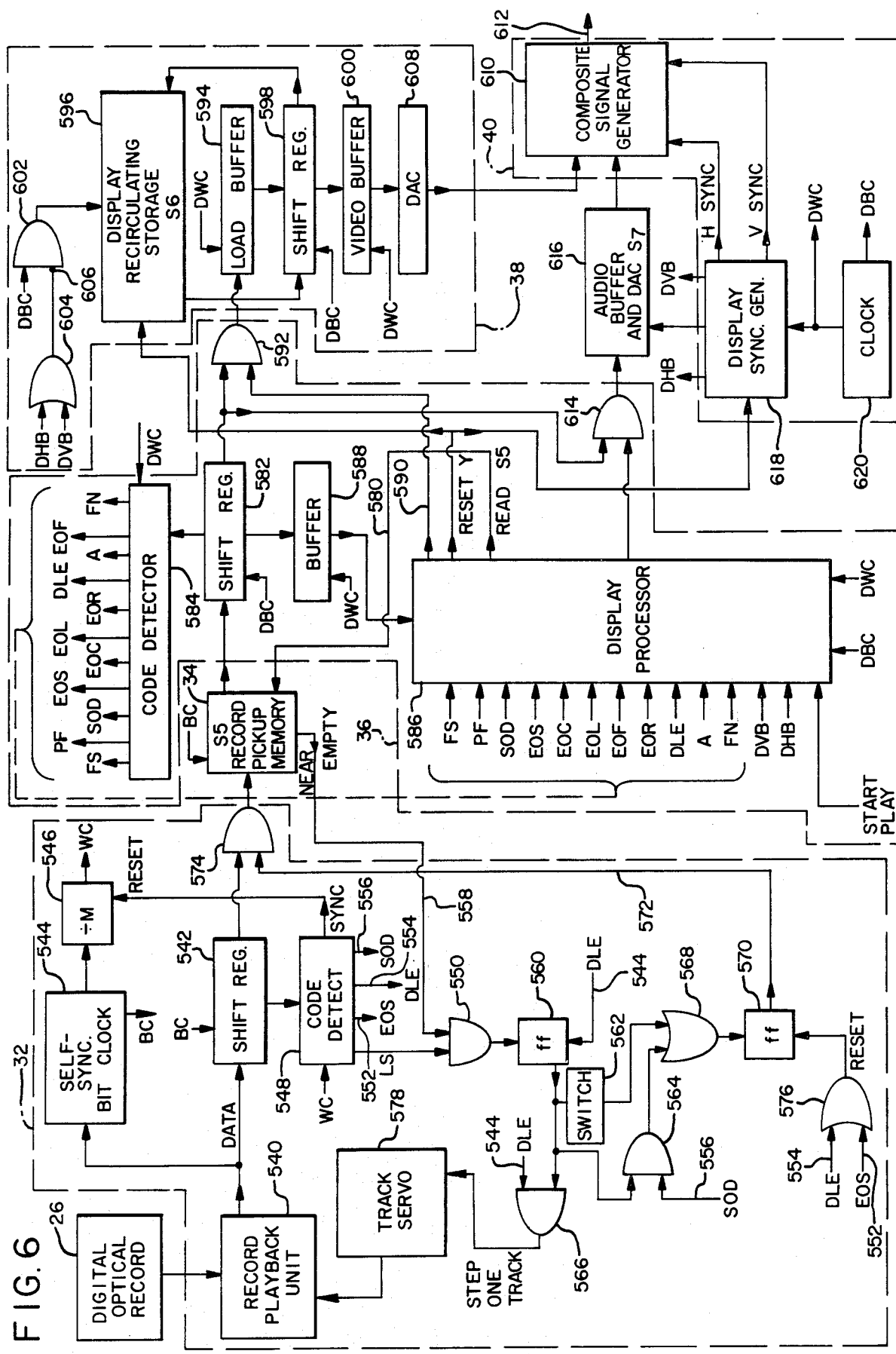
FIG. 6 is a schematic diagram of the electrical circuit of the playback system of FIG. 2.

One embodiment of the playback apparatus is shown in FIG. 6 and includes the intermittent record pickup unit 32.

INTERMITTENT RECORD PICKUP UNIT AND RECORD PICKUP MEMORY $S_5$

The record pickup unit 32 includes a record playback unit 540 having an optical scanner (not shown) for scanning the data tracks of the digital optical record 26. The playback unit may be of the type described in U.S. Pat. No. 3,624,284 of Russell. Data read from the record is transmitted as a digital data signal from playback unit 540 to inputs of a shift register 542 and a self-synchronizing bit clock 544. Clock 544 produces a bit clock output BC which is fed to shift register 542 and also to record pickup memory 34, hereafter referred to as $S_5$. In addition, a BC output of clock 544 is fed to a divide by M divider 546 which in turn produces a word clock output WC. When words of four bit length have been recorded on the data record, M is set equal to four so that divider 546 produces WC pulses that are four bits apart.

As data is moved through shift register 542, in response to the BC pulses, a code detector 548 having an input coupled to the shift register detects the LS, EOS, DLE, SOD and sync code words that have been recorded on the data record. Upon detection of these code words, the WC input to the code detector causes outputs of a positive signal of the duration of the LS code word to an input of an AND gate 550, and a signal derived from the end of the EOS code word on a line 552. Other outputs of detector 548 are a signal derived from the end of the DLE code word on a line 554, a positive signal of the duration of the SOD code word on a line 556 and a sync code word which is transmitted to a reset input of divider 546. With detection of each sync code word, divider 546 is reset so that its WC output is synchronized to the information from the data record.

Gate 550 receives at its other input a near empty signal from record pickup memory 34 on a line 558 whenever the record pickup memory $S_5$ is nearly empty. This near empty signal is intermittently generated by memory $S_5$ at those times when the contents of the memory have been reduced to contain less than a predetermined amount of information, for example, to contain less than two digital lines of data and code words from the data record. Thus, gate 550 conducts during the LS code word at the start of each digital line following the time memory $S_5$ becomes nearly empty.

The output from gate 550 triggers a flip-flop 560 causing it to produce a positive output to inputs of switch 562, and a pair of AND gates 564, 566. Switch 562 is conveniently a capacitive switch that is momentarily turned on by the flip-flop 560 positive output to produce an output signal that is fed through an OR gate 568 to an input of another flip-flop 570. This signal from gate 568 triggers flip-flop 570 to its positive state resulting in a positive output on a line 572 to an AND gate 574 connected between an output of shift register 542 and an input of memory $S_5$. Whenever the positive signal is transmitted on line 572, AND gate 574 conducts and data is unloaded from shift register 542 and clocked into memory $S_5$ by the BC pulses. Switch 562 is included to trigger flip-flop 570 immediately following the LS code word that triggered flip-flop 560 so that the FS, FN, and OE code words, when they are present on the data record following the LS code word, are loaded into memory $S_5$.

Following the OE code word, if any, an SOD code word will be present on the data record and will cause transmission of the SOD signal on line 556 from code detector 548 to an input of gate 564. This enables gate 564 resulting in a positive output signal to gate 568, and hence to flip-flop 570 for the duration of this SOD signal. However, flip-flop 570 is unaffected by this latter positive signal as it has not been reset to its off position after being turned on by switch 562.

Flip-flop 570 is reset by signals at the end of the DLE and EOS code words, fed, on lines 554, 552, respectively, from code detector 548 to an OR gate 576 and then flip-flop 570 to produce a zero output on line 572. When flip-flop 570 is reset, gate 574 is disabled and loading of $S_5$ stops. As explained above, the EOS signal occurs just prior to a copying gap in the data. Assuming the case where gate 574 is disabled at the end of the EOS code word, it will remain disabled until the start of the next SOD code word (which immediately follows the copying gap and sync code word). At this time, gate 564 produces a positive output and triggers flip-flop 570 to its positive state. In this way, the copying gap and following sync signals are deleted prior to reaching $S_5$. Similarly, at the end of the DLE code word gate 574 becomes disabled until such time as the end of the next LS code word is detected and $S_5$ nearly empty. This means that the digital line end gaps, following sync code word and following LS code word, are also deleted prior to reaching $S_5$. In addition, at the end of the DLE code word gate 566 conducts and produces an output to a servo mechanism 578 coupled to playback unit 540. This signal from gate 566 causes deflection of the scanning light beam by servo 578 to the next digital line of the data record.

In the above manner, intermittent record pickup unit 32 intermittently reads groups or bursts of data from the data record, in this case each group comprising a digital line of data, whenever memory $S_5$ becomes nearly empty.

DISPLAY CONTROL UNIT AND DISPLAY STORAGE UNIT

The display control unit 36 of FIG. 6 generates read $S_5$ signals, in a manner explained below, and transmits these signals on a line 580 to memory $S_5$. In response to such read signals, data is fed from memory $S_5$ and clocked into a shift register 582 by a display bit clock signal DBC produced by the reconstructed signal generator 40. A code detector 584 is coupled to an output of shift register 582 and detects the FS, PF, SOD, EOS, EOC, EOL, EOR, EOA, A, EOF and FN code words that have been recorded on the data record. Display word clock pulses DWC fed to code detector 584 cause the readout of these detected code words to inputs of a display processor 586 in the display control unit. An output of shift register 582 is also connected to an input of a buffer memory 588 which is in turn coupled to an input of the display processor. Memory 588 temporarily stores data read from $S_5$ until the data is clocked by DWC pulses from the buffer into the display processor.

A display vertical blanking signal DVB and a display horizontal blanking signal DHB, generated by reconstructed signal generator 40 at the start of the respective vertical and horizontal blanking intervals of the reconstructed signal, are applied to other inputs of the display processor. In addition, the DBC and DWC signals are also fed to display processor 586. Finally, a start play input of the display processor is activated to start the playback system operating.

Although a hard-wired circuit may be employed, conveniently in the preferred embodiment the display processor 586 comprises a microprocessor programmed in accordance with the flow chart of FIG. 10 and described in more detail below in connection with the operation of the playback system. An output of display processor 586 is connected by a line 590 to an input of an AND gate 592 which has it other input connected to an output of shift register 582. At times determined by the display processor, a positive output signal appears on line 590 to enable gate 592 and allow transmission of a data word stored in shift register 582 through gate 592 and into a load buffer 594 of the display recirculating storage unit 38. The display storage unit includes a display recirculating storage 596, hereafter called $S_6$, that has an output connected to a shift register 598. Shift register 598 has a pair of outputs, one connected back to an input of display storage $S_6$ and another connected to an input of a video buffer 600. In addition, an input of shift register 598 is connected to an output of load buffer 594. Furthermore, a reset Y output signal is generated by the display processor and transmitted to an input of storage $S_6$ to clear storage $S_6$ of all data stored in it at the time playback starts.

Display recirculating storage $S_6$ stores a complete frame of video data words with one stored data word being associated with each line subinterval of the frame. Each stored word is recirculated from storage $S_6$ through shift register 598 and, if it is not replaced when it passes through the shift register by a corresponding data word from the display processor, is returned to storage $S_6$. A DBC input to shift register 598 clocks through it.

Recirculation of data from $S_6$ occurs in a first-in-first-out fashion in response to read triggering signals DBC fed to $S_6$ through an AND gate 602. The display horizontal and vertical blanking signals are coupled through an OR gate 604 to an inverter input 606 of gate 602. As a result, gate 602 is disabled. Thus, $S_6$ stops operating during the blanking intervals of he reconstructed signal. At all other times, gate 602 conducts and the DBC signal is fed to storage $S_6$ causing it to recirculate its contents through shift register 598.

As data words pass through shift register 598, they are clocked into a video buffer memory 600 by DWC pulses. The digital data words from buffer 600 are coverted into an analog signal by a digital to analog converter 608 and the analog signal is transmitted to an input of a composite signal generator 610 of reconstructed signal generator 40. Generator 610 produces an output on a line 612 that comprises the reconstructed composite TV signal that was recorded.

When a video data word is received by shift register 582, it is held therein until a replacement time when its position in time in the recorded TV signal matches the position of the data word in the reconstructed signal being fed to shift register 598. For example, assume that the third word of the fourth line of the fifth frame of the recorded TV signal was recorded on the data record as an updated video data word and has been received by shift register 582. The display storage recirculates through the shift register four times, resulting in four frames of the reconstructed signal being produced at output 612, and continues until the word at the third line subinterval of the fourth line of the fifth frame is fed the shift register 598. At this time, a replacement time, gate 592 is enabled by a signal on line 590 from the display processor and the updated video data word in shift register 582 is transmitted to buffer 594. From buffer 594 it is loaded into shift register 598, and hence video buffer 600, in place of the corresponding word from storage $S_6$. This updated video data word is then returned to the display storage 596 for subsequent recirculation.

The display processor determines the position of the data words received by shift register 582 from the code words on the record. As code words are received by shift register 582, they are transmitted to the processor and a read $S_5$ signal is fed from the display processor to memory $S_5$ to cause reading of the next data word from memory $S_5$ into shift register 582. Similarly, after a video data word has been transmitted to buffer 594, the next data word is read from S$_5$. In this manner, memory S$_5$ comprises an asynchronous buffer in that it receives data in bursts, from the data record, but intermittently reads out data words (here one at a time) when directed by signals from the display processor.

Thus, storage S$_6$ is updated through shift register 592 to contain the information recorded on the data record. Furthermore, because all video data word changes have been recorded, the reconstructed signal produced from the recirculating contents of storage S$_6$ will be of high quality.

Display processor 586 also causes the transmission of audio data words received by shift register 582 through an AND gate 614 to an input of an audio buffer 616 which also includes a digital to analog converter and is hereafter called S$_7$. An input signal to AND gate 614 from the display processor enables this gate whenever an audio data word is received by shift register 582. The digital audio data elements are converted to an analog audio signal by the DAC portion of buffer 616 which is transmitted into an input of composite signal generator 610. Transmission of audio data into generator 610 occurs in response to an audio readout signal received by audio buffer S$_7$ from a display sync generator 618 of reconstructed signal generator 40. The display sync generator is triggered by input signals DWC from a clock 620 to produce the display horizontal and vertical blanking interval signals DHB, DVB and also the display horizontal (H) and vertical (V) sync signals. Clock 620 produces the display bit clock signal DBC and uses a divider (not shown) to produce the display word clock signal DWC from the DBC signal. The reset signal from the recording processor is fed to sync generator 618 to reset it at the same time S$_6$ is cleared. This resetting, coupled with the fact that the DBC signal and the outputs of sync generator 618 are derived from the same clock, causes the reconstructed signal to be synchronized with data being read from the data record.

In addition to its video and audio inputs, composite signal generator 610 also receives the horizontal and vertical sync signals from display sync generator 618. Composite signal generator 610 operates in a conventional manner to assemble its inputs into the reconstructed display version of the composite analog television signal supplied to the recording system of FIGS. 1 and 4. In this manner, the playback apparatus of FIGS. 2 and 6 reconstruct the analog TV source signal from the repetition reduced representation thereof that was recorded on the data record.

LOADING OF RECORD PICKUP MEMORY S$_5$

Referring to FIG. 9, the record pickup memory S$_5$ of FIG. 6 is loaded with data in the following manner. A load start procedure block 630 goes to a decision block 632 which asks whether record pickup memory S$_5$ is nearly empty. If not, the block 632 no branch is taken back to the input of block 632 and this question is repeated. Eventually, due to the fact that data is being read from S$_5$ by the display processor, memory S$_5$ will contain less than a predetermined amount of data. At that time, the block 632 yes branch is followed to a decision block 634 which asks if a sync signal is next on the data record. If not, the block 634 no branch returns the routine to the input of block 634 and the block 634 question is repeated. This loop through block 634 and on its no branch back to the input of block 634 is repeated until a sync signal is detected on the data record.

The block 634 yes branch is then followed to a block 636 at which time the WC signal is reset by a signal from code detector 548 to divider 546 in FIG. 6. Thereafter, a decision block 638 is reached and asks if the scanner is still reading the sync signal detected at block 634. If so, the block 638 yes branch is followed back to the input of block 638 and this question is repeated. Eventually the sync code word ends and the routine reaches a decision block 640. At block 640, it is determined by code detector 548 if the next word is an LS code word. If not, this means that the sync signal detected at block 634 followed a copying gap in the data. Because the illustrated record pickup circuit is designed to read entire digital lines of data from the data record, the block 640 no branch is followed back to block 634 as the playback scanner is not in position to begin reading data at the start of the digital line Instead, the scanner is in the middle of a digital line on the record. Eventually, at block 640, an LS code word will be detected. The block 640 yes branch is then taken to a block 642 and loading of data into memory S$_5$ begins. As each data word reaches shift register 542 it is checked at block 644 to determine if it is an EOS code word, and, if not, it is then checked at block 646 to determine if it is a DLE code word.

Assuming that the word is neither a DLE or EOS code word, then the block 646 no branch is taken back to the input of block 642 and loading of the next word into S$_5$ is accomplished. Loading of S$_5$ continues in this manner until an EOS or DLE code word is detected. If it is an EOS code word, this means that the scanner is reading the last word prior to a copying gap. In this case, the block 644 yes branch is followed to block 648 and loading of S$_5$ stops after the EOS code word has been loaded. A decision block 650 follows and asks if the scanner is reading a sync code word. If not, it means that the copying gap has not ended so the block 650 no branch loops back to the block 650 input. The routine loops at block 650 until the end of the copying gap when the sync code word is detected by code detector 548. Thereupon, the sync word is used to reset WC as indicated at block 652, and a decision block 654 is reached. The routine waits at block 654, by looping through the block 654 no branch to the block 654 input, until an SOD word is detected indicating the end of the sync code word detected at block 650. Upon the detection of the SOD code word, the SOD word is loaded and the block 654 yes branch carries the routine to the input of block 642. Loading of S$_5$ continues in this manner until the next EOS or DLE code word is detected. In this manner, the gaps that have been inserted on the data record, as well as the LS and sync code words, are eliminated from the data stream before they reach S$_5$.

Eventually, at block 646, a DLE code word will be detected to indicate that an end of a digital data line of the record has been reached. After the DLE code word is loaded into S$_5$, the yes branch from block 646 is followed to a block 656 and loading of memory S$_5$ is stopped. A block 658 is then reached and the track servo of the record scanner is stepped to the next track on the data record as all of the data from the current digital line of the data record will have been loaded into S$_5$. The routine then goes to the input of block 632 to repeat the loading cycle when S$_5$ again becomes nearly empty. Of course, the record pickup unit can be easily modified to read more than one digital line of data to memory S$_5$ at a time.

PROGRAMMING OF THE DISPLAY PROCESSOR AND LOADING OF DATA FROM $S_5$ into $S_6$ and $S_7$.

Figure 10:
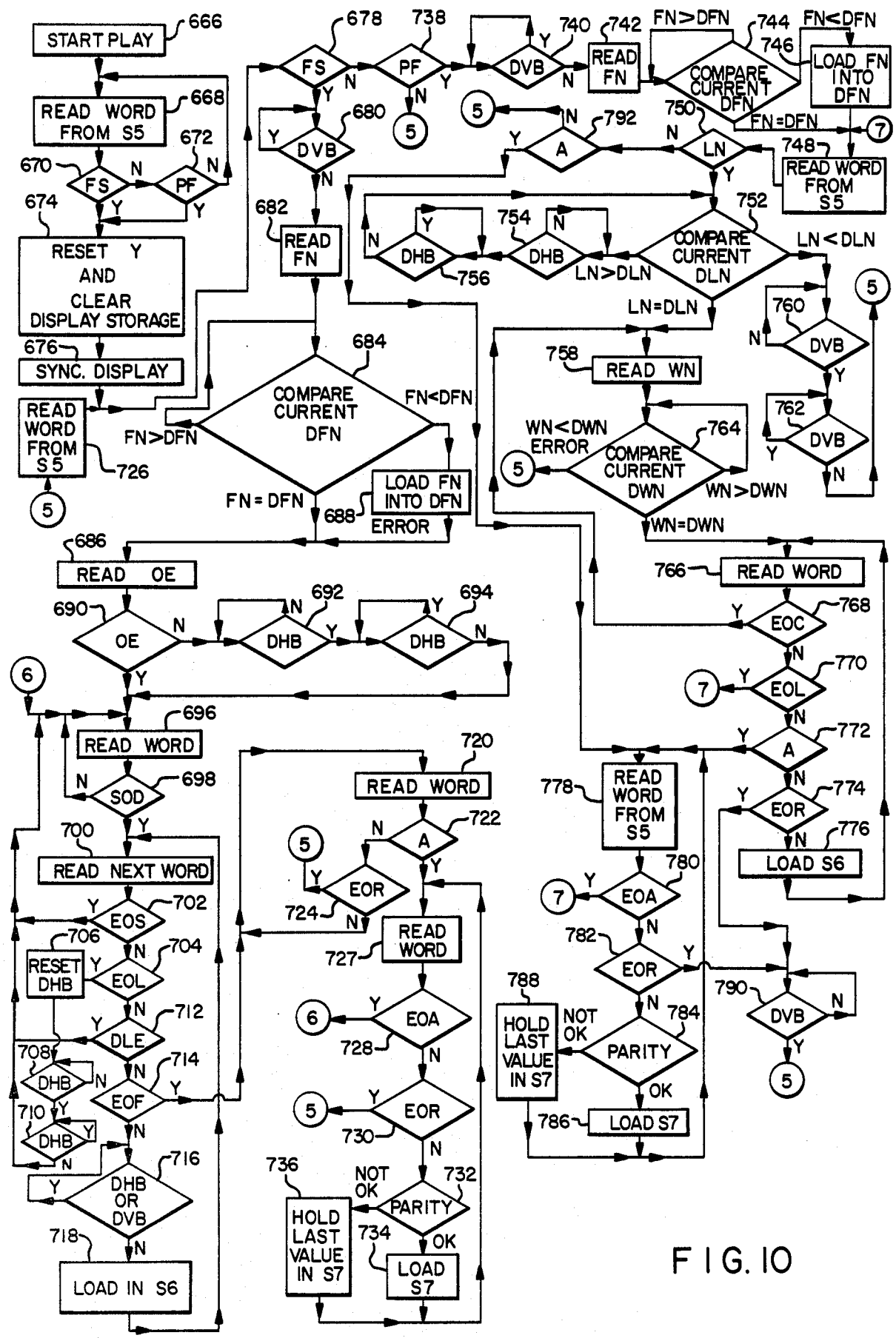
FIG. 10 is a flow chart of the programming of a display processor in the display control of FIG. 6 and of the operation of the playback system of FIG. 2 to reconstruct a signal from a repetition reduced representation of the signal recorded by the record system of FIG. 2 on a data record.

Programming of the display processor 586 in the playback system of FIG. 6 to perform its various functions will become apparent from the flow chart of FIG. 10. Playback is started (i.e. by pushing a start button) at a block 666. Next, a block 668 is reached and display processor 586 causes reading of the first data word from memory $S_5$. A decision block 670 follows to check whether this word is an FS code word. If not, then the block 670 no branch is followed to a decision block 672 and the word is checked to see if it is a PF code word. If the answer is again no, the block 672 no branch is taken back to block 668 and the next word is read from $S_5$. The loop from block 668 through blocks 670, 672 and back to block 668 is repeated until either FS or PF code words are detected. The purpose of this loop is to start initial playback of data to the display processor at the start of a frame of data. The yes branches of blocks 670, 672 both go to a block 674. Thus, when either the FS or PF code word is detected, the display sync generator is reset and the display storage $S_6$ is cleared as shown in block 674 by the reset Y signal from processor 586. A block 676 follows and display sync generator 618 is synchronized to the DBC signal. The routine then goes to a decision block 678 which asks if the word from $S_5$ is an FS code word.

Assuming the word is an FS code word, a decision block 680 is reached and asks if the composite signal generator is in a display vertical blanking interval. If so, the block 680 yes branch is followed back to the input of block 680 and the system repeats this loop until the display vertical blanking interval ends. At the end of this blanking interval, the no branch of block 680 leads to block 682 and the FN code word is read from $S_5$. The FN code word follows the FS word in $S_5$ because of the way in which the data record was coded and $S_5$ was loaded. A decision block 684 follows block 682. At block 684 the FN from the record is compared with the current display frame number, DFN, of the reconstructed signal. Display processor 586 keeps track of the current DFN by counting the DVB signals it receives and incrementing the DFN with every other DVB signal as there are two DVB intervals during each frame. If the FN is greater than the DFN, it means that the reconstructed signal has not yet generated enough frames at its output to reach the frame indicated by the FN. As a result, the FN>DFN branch of block 684 is followed back to the input of block 684 and the comparison is again made. Meanwhile, the reconstructed signal generator continues to produce frames of the reconstructed or display TV signal so that eventually the FN will equal the DFN. When this occurs, the FN=DFN branch of block 684 is taken to a block 686. However, if at block 684 it is determined that FN is less than DFN, this means that an error has occurred because the television signal from reconstructed signal generator 40 has already passed the frame indicated by the FN. There are many ways to compensate for this error. One such way is to follow the FN<DFN branch from block 684 to a block 688 and replace DFN with FN. The display counter will thereupon continue counting the display frame number from this substituted frame number FN. Block 688 also goes to block 686.

At block 686 the odd-even code word is read from $S_5$. Again, due to the coding sequence, the OE code follows the FN code and indicates whether the frame is an odd frame (i.e. the odd lines of the frames have been digitized), or is an even frame (i.e. the even lines of the frame have been digitized). A decision block 690 follows and asks if the TV line being fed from display storage $S_6$ to shift register 598 (the current display television line) is odd or even and if it matches the odd or even frame indication of the OE code. For example, if the OE code indicates an odd frame having odd lines is recorded, then, at block 690 it is determined if the current display TV line is an odd line. If the current line is not odd, the no branch from block 690 is followed to a decision block 692 which forms part of a loop designed to hold up reading of data from $S_5$ until the next display TV line, an odd line, is recirculated from $S_6$.

Block 692 asks if the display TV signal is in a horizontal blanking interval. If not, the block 692 no branch is followed back to the input of block 692. This question is repeated until the DHB signal is reached indicating the end of the TV line and the block 692 yes branch is followed to a block 694. Block 694 asks if the display TV signal is in a display horizontal blanking interval. The initial answer to this question is most likely yes as the display is in the DHB interval determined at block 692. As a result the block 694 yes branch is followed and the block 694 step is repeated. At the end of the DHB interval the no branch of block 684 is followed to a block 696. In this manner, if the current display TV line does not match the oddness or evenness determination at block 690, block 696 is not reached until the display TV signal has reached the next TV line. In contrast, if the OE and display line oddness or evenness matches, the block 690 yes branch is followed to block 696 without waiting for the next display TV line.

At block 696 the next data word is read from $S_5$ to the display processor and at the following block 698 it is determined if this next word is an SOD code word. If not, the routine fellows the block 698 no branch back to block 696 and the next word is read. Eventually, block 698 will detect an SOD code word and its yes branch is followed to a block 700 whereupon the next word is read from $S_5$.

A decision block 702 then determines whether the last data read at block 700 is an EOS code word. If yes, the block 702 yes branch returns the routine to block 696 for reading of another word from $S_5$. In contrast, if at block 702 an EOS word is not detected, a decision block 704 follows and the word is checked to see if it is an EOL code word. Assuming at block 704 an EOL word is detected, then a block 706 is reached and the display horizontal blanking signal is reset to occur at this time as the end of a TV line has been reached. Thereafter, decision blocks 708 and 710 are reached. The steps of blocks 708, 710 are like those desccribed above for blocks 692 and 604 and operate to allow the display TV signal to read out the next complete TV line before the routine is returned to block 696. This means that, in odd frame cases where data from odd lines have been recorded on the data record, the even lines will be displayed before data from following odd lines are read from $S_5$. Similarly, in even frame cases, the odd lines will be displayed before data from following even lines are read from $S_5$.

Return to block 704, if an EOL code word is not detected at this point, then a decision block 712 is reached and the data word is tested to determine if it is a DLE code word. When the answer is yes, block 696 is again reached and the next data word is read from $S_5$.

However, a no answer steps the routine from block 712 to a block 714 which asks if the word is an EOF code word. If not, a block 716 follows to determine if the display TV signal portion is in either a horizontal or vertical blanking interval. If so, $S_6$ stops operating. The routine stays at block 716 by following the 716 yes branch back to the input of block 716 until the display blanking interval ends and a block 718 is reached. At block 718 the data word is loaded into $S_6$. It should be noted that video data words, and not code words, are present when block 718 is reached. Therefore, the storage space in recirculating storage $S_6$ only contains video data words. From block 718 the routine returns to block 700 and the next data word is read from $S_5$ to the display processor and the process continues.

At block 714 an EOF code word will eventually be detected. When this occurs, the block 714 yes branch is followed to a block 720 and the next data word is transferred to the display control from $S_5$. The read word at block 720 is checked at a block 722 to determine if it is an A code. If not, a block 724 is reached and the word is checked to see if it is an EOR code word. Assuming it is an EOR code word, this indicates that all of the video and audio data words from a frame have been read from $S_5$. As a result, the block 724 yes branch is followed to position 5 and then to a block 726 whereupon the next word is read from 5. As this next word is from a following frame the routine will go to block 678 whereupon updating of the reconstructed TV signal continues. On the other hand, if the data word at block 724 is not an EOR word, the block 724 no branch carrries the routine back to block 720 and the next data word is read from $S_5$.

An A code usually will be detected at block 722 following the EOF code at block 714. This steps the routine from the block 722 yes branch to procedure block 727 and the next data word is read from $S_5$. This next word will be an EOA code word in those cases where there is no audio information associated with the field whose end was detected at block 714. From block 728, the routine goes to a position 6 at the imput of block 696 in such cases. This enables data from the next field of the frame to be loaded in $S_6$ as previously explained in connection with the blocks from 696 to 718. In contrast, if an EOA word is not detected at block 728, a decision block 730 is reached and asks if the word read at block 726 is an EOR word. Assuming this is not the case, then the word at block 730 is an audio data word and its parity is checked at a block 732. The parity of the audio data word is calculated as previously explained by adding up the number of positive bits in the word and assigning the word a parity depending upon whether there are an odd or an even number of positive bits. The calculated parity is compared with the parity expected from the parity bit of the word. If the parity is proper, the audio data word, with its parity bit deleted, is loaded into storage $S_7$ at a block 734. In contrast, if the parity of the word does not match the expected parity, an error in the audio data word is indicated and the not OK branch from block 732 is followed to a block 736. Although there are other ways of correcting an error in an audio data word, at block 736 the last audio data word received by audio storage $S_7$ is held in a separate storage of its buffer portion 616 until the parity of the next audio data word is checked. If an error is present in this next audio data word, the held audio data word is substituted in place of the erroneous word and fed to the composite signal generator.

Blocks 736 and 734 decision back to block 727 for reading of the next data word from $S_5$. Eventually, an EOA code word will be detected at block 728 at the end of audio data words following each first field of frames. When this occurs, the block 728 yes branch is followed to position 6 and through the data beginning at block 696 for updating the reconstructed Tv signal with data from the next TV field. At some point, block 730 will detect an EOR code word and will step the routine to position 5. Thereafter, additional information from a following frame is loaded from $S_5$ into display control 36.

Upon a subsequent cycle through the routine, block 678 may determine that the word received from $S_5$ at that point is not an FS word. In such a case, a block 738 is reached and the word is checked to see if it is a PF word. If not, then block 738 returns the routine to position 5 and the next word is read from $S_5$. However, if a PF word is detected at block 738, then $S_5$ contains data from a partial frame (i.e. that was recorded on the data record from $S_3$) and a block 740 follows. Block 740 determines if the display TV signal is in a DVB interval, and if so, the routine remains at block 740 until the DVB interval ends.

Blocks 742, 744 and 746 follow block 740 and operate in the same manner as previously described in connection iwth blocks 682, 684 and 688. These blocks compare the DFN with the FN that follows the PF code word and when they are equal or FN<DFN if an error is present, then the next word is read from $S_5$ at a block 748. This word is then checked at a block 750 to see if it is an LN code word. In this case, because an LN word will follow an FN word, the block 750 yes branch is followed to a block 752 and the LN is compared with the line number of the reconstructed TV signal (current display line number). If the LN is greater than DLN it means that the reconstructed signal generator has not yet produced an output of the line equal in number to LN. In this case, the >LN DLN branch of block 752 is followed to blocks 754 and 756. These blocks are like blocks 692 and 694 and hold up routine until the line ends. At that time the routine returns to block 752 and the LN is again compared with the DLN.

Eventually the LN will equal the DLN so that the LN=DLN branch of block 752 is followed to a block 758. At block 758, a word number code WN, which follows the LN word, is read from $S_5$ to the display processor.

Note that, if it is found at block 752 that LN is less than DLN, an error has occurred as the reconstructed signal generator 40 has already displayed the line indicated by the LN read from $S_5$. As one way of compensating for such as error, the LN DLN branch of block 752 is followed to a decision block 760 which asks if the display TV signal has reached a display vertical blanking interval. If the answer is no, the block 760 no branch loops back to the input of block 760 and the question is repeated. The routine remains at block 760 until such a display vertical blanking interval is detected. Thereafter, the block 760 yes branch is taken to a block 762 which asks whether displayed TV signal is in a display vertical blanking interval. If so, the block 762 yes branch is followed back to the input of block 762 and the question at block 762. when the DVB ends, the block 762 no branch is taken to position 5 and new data is read from $S_5$. In this manner, blocks 760, 762 hold up the routine until the end of the field following the presence of an error at block 752.

Returning to block 758, after a WN word is read at this block, a decision block 764 is reached. At block 764 the WN is compared with the display word number, DWN, of the word being recirculated from storage $S_6$. If WN is greater than DWN, this means that words of the line detected at block 752 being recirculated from storage $S_6$ have not yet reached the WN read at block 758. Consequently, the WN>DWN branch of block 764 is followed back to the input of block 764 and the question is repeated. The routine stays at block 764 until WN equals DWN and the WN=DWN branch of block 764 is followed to a block 766. However, if the WN at block 764 is greater than the DWN, then the display storage $S_6$ has already recirculated past the position of the WN in a line and an error has occurred. In this event, the WW<DWN branch of block 764 is followed to position ⑤ and the procedure continues.

At block 766 the next word is read from $S_5$. A block 768 then tests if this word is an EOC code word. The presence of such a word indicates the end of a segment of changed information on the TV line detected at block 752. Upon detection of an EOC word at block 768, the routine returns to block 758 and the next WN is read. This WN will be from the same TV line due to the manner of coding the data record.

In contrast, a block 770 is reached if at block 768 an EOC word is not detected. Block 770 checks if the word read at block 766 is an EOL word. If so, an end of a TV line is indicated and the block 770 yes branch returns the routine to position ⑦ for continuing the procedure with the next line of recorded information. If the word at block 770 is not an EOL word, a block 772 follows and checks if the word is an A code word. Such an A word would indicate that audio information, if any is present in $S_5$, will next be read from $S_5$ at a block 778. In contrast, if the word at block 772 is not an A word, a block 774 then asks if it is an EOR word. If not, then the word must be a video data word and it is loaded at a block 776 into $S_6$. Thereafter, block 776 is again reached and the routine continues. Next assume that when block 772 is again reached, the A code word is present so that block 778 follows. If the word read at block 778 is determined at the next block 780 to be an EOA word, then all of the audio data (if any was present) at the end of the video TV field just recirculated through $S_6$ has been read fron $S_5$. In this case, the yes branch of block 780 is taken back to position ⑦ for reading of data from $S_5$ for the next TV field.

On the other hand, if the word checked at block 780 is not an EOA word, block 782 is reached and the word is tested to see if it is an EOR word. If not, the word must be an audio data word so blocks 784, 786 and 788 are reached and audio data is loaded into $S_7$. The steps of blocks 784, 786 and 788 are the same as those of blocks 732, 734 and 736 and for this reason will not be discussed further.

If at blocks 774 or 782 it is determined that an EOR code word is present, the yes branches of these blocks are followed to a block 790 which asks if the display is in a vertical blanking interval. The presence of the EOR code word indicates the end of all data on the record, both video and audio, from a particular frame. Block 790 holds up the routine until the DVB signal is reached which means that the display has also reached the end of the frame. At this time the routine goes to position ⑤ for reading of data from $S_5$ that is from a following frame.

Returning to block 750, if the word read at block 748 is not an LN word, then the block 750 no branch is followed to a block 792. Words reaching block 792 should be A code words in which case block 778 is reached and audio data is read from the record and loaded into $S_7$ as previously described. However, if the word at block 792 is not an A word, then the block 792 no branch is followed back to position ⑤ and the routine proceeds.

In the above manner, display control 36 insures that video data words in storage $S_6$ are refreshed or updated by corresponding new video data words from the data record, and in addition, that audio data words are transmitted from the record to the reconstructed signal generator 40. Generator 40 in turn assembles the incoming data into the display analog television signal. This display signal comprises a reconstructed version of the signal recorded in a repetition reduced form on the data record.

It will be obvious to those having ordinary skill in the art that many changes may be made in the above-described details of the preferred embodiments of the present invention without departing from the spirit of the invention. Therefore, the scope of the present invention should only be determined bu the following claims.

What is claimed is:

1. An apparatus for recording on a data record a repetition reduced digital representation of a signal, said signal having periodic time intervals and the digital representation having plural digital data words, wherein each said data word corresponds to the signal occurring during an associated time subinterval, the digital representation also having a plurality of sets of said data words with each set corresponding in number to the number of time subintervals of one of said periodic intervals, and each data word of each set being associated with a time subinterval occurring at a different position in time from the beginning of a periodic interval, said apparatus comprising:

recirculating storage means for storing one of said sets of data words;

comparator means for comparing each stored data word of the stored set applied by said storage means to one input of the comparator means with a received data word applied to another input of the comparator means, the compared stored data word being associated with a first subinterval of one periodic interval and the compared received data word being associated with a second subinterval of another periodic interval subsequent to said one periodic interval, the first and second subintervals each occurring at the same position in time from the beginning of its periodic interval, said comparator means including output means for replacing the compared stored data word in said storage means with the compared received data word when the compared received data word differs from the compared stored data word by a predetermined value, the compared received data word being stored in said storage means as an updated data word; and variable bandwidth recording means including changed data memory means coupled to the output means of said comparator means for storing said updated data words received from said comparator means, intermittent recording control means for causing said memory means to produce an intermittent output of updated data words, and recording means for recording the intermittent output of updated data words on the data record.

2. An apparatus according to claim 1 wherein said signal comprises a television signal, the periodic intervals being frames of said television signal, the time subintervals being subintervals of lines of said frames, and wherein the data elements of the set of data words stored by said recirculating memory means are from at least two frames.

3. An apparatus according to claim 1 wherein said signal comprises a television signal, the periodic intervals being frames of said television signal, the time subintervals being subintervals of lines of said frames, and wherein at the end of each periodic interval the data words of the set of data elements stored by said recirculating memory means correspond to the two fields of one frame of the signal.

4. An apparatus according to claim 1 wherein said recording means includes means for transmitting position reference signals to said recording control means, said position reference signals being indicative of the position on the data record where the recording means will next record, and wherein said recording control means comprises means for causing the output of updated data words from said memory means to said recording means to occur when said recording means is ready to record on selected positions of the data record.

5. An apparatus according to claim 1 wherein said recording means comprises means for recording a digital optical data record.

6. An apparatus according to claim 1 wherein said recording control means includes selective output means for selectively coupling said recording means through said recording control means to an output of said storage means and to an output of said memory means, said selective output means comprising means for causing an output of updated data words from the output of said memory means to said recording means at the end of each said periodic interval when no more than a predetermined amount of data is received by said memory means during said each periodic interval, said selective output means also comprising means for causing an output of at least a portion of the set of stored data words from the output of said storage means to said recording means at the end of each said periodic interval when more than said predetermined amount of data is received by said memory means during said each periodic interval.

7. An apparatus according to claim 6 wherein said selective output means comprises means for preventing said recording means from receiving an output of stored data words from said storage means at the end of at least certain of said periodic intervals during which no updated data words are stored in said memory means and for preventing said recording means from receiving an output of updated data words from said memory means at the end of said at least certain of said periodic intervals.

8. An apparatus according to claim 6 wherein said recording means includes means for transmitting position reference signals to said recording control means, said position reference signals being indicative of the position on the data record where the recording means will next record, and wherein said selective output means comprises means for causing the output of updated data words from said memory means to said recording means to occur when said recording means is ready to record on selected positions of the data record, said selective output means also including means for causing the output of said at least a portion of the set of stored data words transmitted from said storage means to said recording means to occur when said recording means is ready to record on selected positions of the data record.

9. An apparatus according to claim 8 wherein said selective output means comprises means for causing the output of updated data words from said memory means to said recording means and the output of said at least a portion of the set of stored data words transmitted from said storage means to said recording means to occur when said recording means is ready to record on the position of the data record immediately following the position containing the last recorded information.

10. An apparatus for recording on a digital optical data record a repetition reduced digital representation of an analog television signal, the television signal having frames which each contain a first and second field with a vertical blanking interval at the end of each field, each field having lines with a horizontal blanking interval at the end of each line, said apparatus comprising:

digitization means for converting said television signal into a digital signal having data words, each data word representing the television signal occurring during a particular line subinterval, a set of successive data words representing a line, the digital signal also having a plurality of groups of said sets with each group representing one-half the lines of a frame;

recirculating storage means coupled to an output of said digitization means and including a first and second recirculating storage means, wherein said first recirculating storage means receives and stores one of said groups and said second recirculating storage means receives and stores another of said groups, the lines represented by said one stored group being at different positions in a frame than the lines represented by said another stored group;

comparator means for comparing each stored data word of the stored sets applied by said storage means to one input of said comparator means with a received data word applied by said digitization means to another input of the comparator means, the compared stored data word representing the television signal occuring during a first line subinterval of one frame and the compared stored data word representing the television signal occurring during a second line subinterval of another frame subsequent to said one frame, the first and second line subintervals each occuring at the same position in time from the beginning of its frame, wherein when the compared received and compared stored data words differ by a predetermined value the compared stored data word is replaced in its recirculating storage means with the compared received data word and the compared received data word is stored as an updated data word;

word identification means for generating position code words identifying the frame, line and line subinterval position of said updated data words;

changed data memory means connected to the outputs of said comparator means and said word identification means for receiving and storing said position code words and said updated data words;

intermittent recording control means connected to said memory means for causing said memory means to produce an intermittent output of updated data words and position code words; and recording means for recording the intermittent output of updated data words and position code words on the data record.

11. An apparatus according to claim 10 wherein said digitization means comprises means for converting only alternate lines of said television signal into data words.

12. An apparatus according to claim 10 wherein said recording control means includes selective output means for selectively coupling said recording means through said recording control means to outputs of said first recirculating storage means, said second recirculating storage means and said memory means.

13. An apparatus according to claim 12 wherein during a half frame increment of a plurality of first and second half frame increments said comparator means received data words corresponding in number to the number of data words of one-half of a frame, said comparator means receiving during said first increments received data words representing lines at the same position in a frame as the lines represented by said one group stored in said first recirculating storage means, receiving during said second increments received data words representing lines at the same position in a frame as the lines represented by said another group stored in said second recirculating storage means, and producing an output of updated data words during each first and second increment, said selective output means comprising means for causing said memory means to produce an output of position code words and updated data words to said recording means at the end of each said first and second increments, when no more than a predetermined amount of data is received by said memory means during each first and second increment, said selective output means also comprising means for causing an output of the stored group of data words from said first recirculating storage means to said recording means at the end of each first increment when more than said predetermined amount of data is received by said memory means during each first increment, and for causing an output of the stored group of data words from second recirculating storage means to said recording means at the end of each second increment when more than said predetermined amount of data is received by said memory means during each second increment.

14. An apparatus according to claim 13 wherein said one group represents lines of the first field during one of said frames and said another group represents lines of the second field during said one frame, said first and second time increments each correspond in duration and position in time to a field of a frame, said first time increments corresponding to the first fields of frames and said second time increments corresponding to the second fields of frames.

15. An apparatus according to claim 13 wherein said digitization means comprises means for converting only alternate lines of each frame of pairs of first and second frames of said television signal into data words, the lines converted during said first frames being at different positions in the frame than the positions of the lines converted during said second frames, and wherein said one group represents lines during one of said first frames and said another group represents lines during the second frame immediately following said one first frame, said time increments each corresponding in duration and position in time to one frame, said first time increments corresponding to first frames and said second time increments corresponding to second frames.

16. An apparatus according to claim 12 wherein said first and second recirculating storage means comprise alternately operating storage means with the first storing updated data words while the output of the group of stored data words from the second is received by said recording means and the second storing updated words while output of the first is received by said recording means.

17. An apparatus according to claim 16 including rate synchronization circuit means for adjusting the average rate the output of data words from each said recirculating storage means is received by said recording means to equal the average rate that stored data words from each other said recirculating storage means are compared with said received data words.

18. An apparatus according to claim 10 wherein said memory means conmprises a first-in-first-out memory means, and said word identification means comprises means for producing a first position code word associated with a series of data words, said series of updated data words corresponding to a series of successive line subintervals, said word identification means comprising means for producing a second position code word indicating the end of the last data word of the series so that the number of position code words identifying the updated words of the series are reduced.

19. An apparatus according to claim 18 wherein said word identification means comprises means for producing said first position code word prior to the first updated data word of said series of updated data words and for producing said second position code word following the last updated data word of said series of updated words so that said changed data memory means stores said first position code word followed by said series of updated data words which are followed by said second position code word.

20. An apparatus according to claim 10 wherein said digitization means includes means for producing digital audio data words corresponding to an audio portion of said television signal, said apparatus including audio storage means being connected to said recording control means and to said recording means, said recording control means including means for causing an output of stored audio data words from said audio storage means to said recording means during selected time intervals.

21. An apparatus according to claim 20 wherein the selected time intervals are during the vertical blanking interval at the end of each field of the television signal.

22. A playback apparatus for reconstructing a signal having periodic time intervals from a data record containing a repetition reduced digital representation of the signal, each said periodic time interval having a set of subintervals and the digital representation including digital data elements each corresponding to a particular subinterval of a particular one of said periodic intervals, a set of said digital data elements corresponding to the set of subintervals of one such periodic interval, said apparatus comprising:

intermittent record pickup means for reading data from the record;

record pickup memory means coupled to said record pickup means for temporarily storing the data read from the record and for causing said intermittent record pickup means to intermittently read the record when said memory means contains less than a predetermined amount of stored data;

display control means for receiving data stored in said memory means and for causing an output of data from said memory means;

display recirculating storage means coupled to said display control means for receiving and storing data elements, wherein said storage means stores the set of data elements corresponding to the set of subintervals of one periodic interval, said display control means including means for replacing each data element stored in said storage means with data elements from the data record which correspond to the same subinterval in a following periodic interval of the signal; and reconstructed signal generating means for periodically receiving the set of stored data elements stored in said storage means and for reconstructing said signal.

23. An apparatus according to claim 22 wherein said record pickup means comprises means for intermittently reading a predetermined amount of data from the record.

24. An apparatus according to claim 22 wherein the signal is a television signal having frames which each contain a first and second field with a vertical blanking interval at the end of each field, each field having lines with a horizontal blanking interval at the end of each line, the digital data elements being data words each corresponding to the television signal occurring during a particular line subinterval of time of a particular line of a particular frame, a set of said data words corresponding to the line subintervals of one frame, the digital representation including position code words identifying the frame, line and position in time of the line subinterval of each said data word, wherein said storage means stores the set of data words of one frame, said reconstructed signal generator means comprising composite signal generator means coupled to an output of said storage means for receiving the set of stored data words from said storage means at least once during each frame of the reconstructed television signal, wherein said display control means comprises means for replacing data words stored in said display recirculating storage means with data words of the following frame which corrrespond to the same line and line subinterval.

25. An apparatus according to claim 24 wherein said display control means receives a data word and position code word from said memory means and stores both the received position code word and data word until a replacement time when the position in time of the received data word corresponds to the frame, line and line subinterval of a data word stored in said storage means, said display control means at said replacement time causing the received data word to replace the data word stored in said storage means and causing said memory means to produce an output of another data word and position code word to said display control means thereby reducing the amount of data stored in said memory means.

26. An apparatus according to claim 24 wherein said record pickup means comprises means for reading a digital optical record.

27. A record and playback apparatus for recording on a digital optical data record a repetition reduced digital representation of a television signal and for playing back the data record to reconstruct the television signal, said apparatus comprising:

digitization means for converting the television signal into a digital signal having data words, each data word representing the television signal occuring during a particular line subinterval, a set of successive data words representing a line, the digital signal also having a plurality of groups of said sets with each group representing a frame;

recirculating storage means coupled to an output of said digitization means for receiving and storing the group representing the data words during one frame;

comparator means for comparing each of said stored data words stored in said recirculating storage means with a received data word received from said digitization means which corresponds to the same line and line subinterval in a subsequent frame following the frame containing the stored data word, wherein when the compared received and compared stored data words differ by a predetermined value the compared stored data word is replaced with the compared received data word is stored as an updated data word;

word identification means for generating position code words identifying the frame, line and line subinterval position of said updated data words;

changed data memory means connected to the outputs of said comparator means and said word identification means for receiving and storing said position code words and said updated data words;

intermittent recording control means connected to said changed data memory means for causing said changed data memory means to produce an intermittent output of updated data words and position code words; and recording means for recording the intermittent output of updated data words and position code words on the data record;

intermittent record pickup means for reading data from the record;

record pickup memory means coupled to said record pickup means for temporarily storing the data read from the record and for causing said intermittent record pickup means to intermittently read the record when said changed data memory means contains less than a predetermined amount of stored data;

display control means for receiving data stored in said record pickup memory means and for causing an output of data from said record pickup memory means;

display recirculating storage means coupled to said display control means for receiving and storing data words, wherein said display recirculating storage means stores the group of data words corresponding to the line subintervals of one frame, said display control means including means for replacing each data word stored in said display recirculating storage means with data words from the data record which correspond to the same line and line subinterval in a following frame of the television signal; and composite signal generating means for periodically receiving each group of stored data words stored in said display recirculating storage means and for reconstructing said television signal.

28. An apparatus according to claim 27 wherein said recording control means includes selective output means for selectively coupling said recording means through said recording control means to an output of said storage means and to an output of said changed data memory means, said selective output means comprising means for causing an output of updated data words from the output of said changed data memory means to said recording means at the end of each frame when no more than a predetermined amount of data is received by said changed data memory means during said each frame, said selective output means also comprising means for causing an output of at least a portion of the set of stored data words from the output of said storage means to said recording means at the end of each said frame when more than said predetermined amount of data is received by said changed data memory means during said each frame.

29. An apparatus according to claim 27 wherein said record pickup means comprises means for intermittently reading a predetermined amount of data from the record.

30. An apparatus according to claim 27 wherein said display control means receives a data word and position code word from said record pickup memory means and stores both the received position code word and data word until a replacement time when the position in time of the received data word corresponds to the frame, line and line subinterval of a data word stored in said display storage means, said display control means at said replacement time causing the received data word to replace the data word stored in said display storage means and causing said record pickup memory means to produce an output of another data word and position code word to said display control means thereby reducing the amount of data stored in said record pickup memory means.

* * * * *

UNITED STATES PATENT AND TRADEMARK OFFICE
CERTIFICATE OF CORRECTION

PATENT NO. : 4,150,397
DATED : April 17, 1979
INVENTOR(S) : James T. Russell

It is certified that error appears in the above-identified patent and that said Letters Patent are hereby corrected as shown below:

Column 3, line 15, after "DRAWINGS" delete --flag--;

Column 5, line 43, after "updated" insert --data--;

Column 6, line 45, after "preset" insert --amount--;

Column 7, line 44, change "output" to --input--;

Column 13, line 23, change "an" to --the--;

Column 14, line 51, change "66" to --166--;

Column 15, line 9, change "164" to --165--;

line 13, change "162" to --172--;

Column 21, line 9, change "194" to --184--;

line 10, change "cord" to --code--;

Column 23, line 62, change "rests" to --resets--;

Column 24, line 68, change "$C_2$" to --C2--;

Column 25, line 50, after "to" insert --a--;

line 52, after "or" delete --it--;

Column 26, line 3, change "turns" to --returns--;

line 22, change "operational" to --optional--;

line 28, change "amy" to --may--;

UNITED STATES PATENT AND TRADEMARK OFFICE
CERTIFICATE OF CORRECTION

PATENT NO. : 4,150,397
DATED : April 17, 1979
INVENTOR(S) : James T. Russell

It is certified that error appears in the above-identified patent and that said Letters Patent are hereby corrected as shown below:

Column 26, line 33, change "$C_2$" to --C2--;

Column 27, line 23, after "then" insert --a--;

line 43, after "updated" insert --data--;

Column 28, line 5, change "falg" to --flag--;

line 21, change "j" to --J--;

line 26, change "postion" to --position--;

line 31, change "thrugh" to --through--;

line 48, change "processor" to --Processor--;

Column 29, line 4, change "ldata" to --decision--;

line 5, change "if" to --If--;

line 8, change "dta" to --data--;

line 25, change "than" to --then--;

line 35, change "if" to --If--;

line 36, change "indicted" to --indicated--;

Column 31, line 20, change "such" to --each--;

line 50, change "to" to --or--;

line 55, change "located" to --loaded--;

UNITED STATES PATENT AND TRADEMARK OFFICE
CERTIFICATE OF CORRECTION

PATENT NO. : 4,150,397
DATED : April 17, 1979
INVENTOR(S) : James T. Russell

It is certified that error appears in the above-identified patent and that said Letters Patent are hereby corrected as shown below:

Column 34, line 67, after "then" insert --to--;

Column 36, line 15, after "stored" insert --data--;

line 19, after "clocks" insert --data--;

line 27, change "he" to --the--;

line 33, change "coverted" to --converted--;

line 52, change "the" (third occurrence) to --to--;

line 57, after "hence" insert --into--;

Column 38, line 17, after "line" insert --.--;

Column 40, line 27, change "684" to --694--;

line 38, change "fellows" to --follows--;

line 44, after "data" insert --word--;

line 55, change "604" to --694--;

line 64, change "Return" to --Returning--;

Column 42, line 1, change "decision" to --go--;

line 6, change "data" to --steps--;

line 27, change "iwth" to --with--;

line 41, after "up" insert --the--;

UNITED STATES PATENT AND TRADEMARK OFFICE
CERTIFICATE OF CORRECTION

PATENT NO. : 4,150,397
DATED : April 17, 1979
INVENTOR(S) : James T. Russell

It is certified that error appears in the above-identified patent and that said Letters Patent are hereby corrected as shown below:

Column 42, line 53, change "as" to --an--;

line 64, change "when" to --When--;

Column 43, line 16, change "WW" to --WN--;

line 39, change "776" second occurrence to --766--;

Column 44, line 25, change "bu" to --by--;

Column 45, Claim 2, line 7, change "elements" to --words--;

Claim 3, line 15, change "elements" to --words--;

Column 48, Claim 16, line 10, after "updated" insert --data--;

Claim 18, line 21, change "conmprises" to --comprises--;

line 26, after "means" insert --also--; and

Column 49, Claim 24, line 47, change "the" first occurrence to --a--.

Signed and Sealed this

Twenty-ninth Day of July 1980

[SEAL]

Attest:

SIDNEY A. DIAMOND

Attesting Officer

Commissioner of Patents and Trademarks